(12) United States Patent
Garcia Morchon et al.

(10) Patent No.: US 11,569,993 B2
(45) Date of Patent: Jan. 31, 2023

(54) CONFIGURABLE DEVICE FOR LATTICE-BASED CRYPTOGRAPHY

(71) Applicant: KONINKLIJKE PHILIPS N.V., Eindhoven (NL)

(72) Inventors: Oscar Garcia Morchon, Eindhoven (NL); Ludovicus Marinus Gerardus Maria Tolhuizen, Waalre (NL); Sauvik Bhattacharya, Eindhoven (NL); Jose Luis Torre Arce, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 470 days.

(21) Appl. No.: 16/755,899

(22) PCT Filed: Oct. 10, 2018

(86) PCT No.: PCT/EP2018/077639
§ 371 (c)(1),
(2) Date: Apr. 14, 2020

(87) PCT Pub. No.: WO2019/076706
PCT Pub. Date: Apr. 25, 2019

(65) Prior Publication Data
US 2020/0259649 A1  Aug. 13, 2020

(30) Foreign Application Priority Data

Oct. 17, 2017 (EP) ..................................... 17196812
Mar. 30, 2018 (EP) ..................................... 18165330

(51) Int. Cl.
*H04L 9/30* (2006.01)
*H04L 9/08* (2006.01)

(52) U.S. Cl.
CPC .......... *H04L 9/3093* (2013.01); *H04L 9/0819* (2013.01); *H04L 9/0838* (2013.01)

(58) Field of Classification Search
CPC combination set(s) only.
See application file for complete search history.

(56) References Cited

U.S. PATENT DOCUMENTS

2012/0166809 A1  6/2012  Barton et al.
2019/0386828 A1  12/2019  Garcia Morchon

FOREIGN PATENT DOCUMENTS

CN    104396184 A  *  3/2015  ........... H04L 9/0819
EP        3364596 A1  *  8/2018  ........... H04L 9/0838
(Continued)

OTHER PUBLICATIONS

Ludo Tolhuizen et al "Improved key reconciliation method", Cryptology ePrint Archive, Report (2017).
(Continued)

*Primary Examiner* — Jeffrey C Pwu
*Assistant Examiner* — Paul J Skwierawski

(57) ABSTRACT

Some embodiments relate to a first electronic network node is provided (110) configured for a cryptographic operation. The first network node is configured to receive as input a difficulty parameter (d), and a structure parameter (n), and to obtain a shared matrix (A), the shared matrix being shared a second network node through a communication interface, entries in the shared matrix (A) being selected modulo a first modulus (q), the shared matrix (A) being a square matrix (k×k) of dimension (k) equal to the difficulty parameter (d) divided by the structure parameter (n), the entries in the shared matrix (A) being polynomials modulo a reduction polynomial (f) of degree equal to the structure parameter (n), said cryptographic operation using the shared matrix.

21 Claims, 4 Drawing Sheets

(56) References Cited

FOREIGN PATENT DOCUMENTS

| EP | 3373505 | A1 | * | 9/2018 | ............. | G06F 17/16 |
|---|---|---|---|---|---|---|
| EP | 3373505 | A1 | | 9/2018 | | |
| EP | 3474484 | A1 | * | 4/2019 | ............. | G06F 7/582 |
| EP | 3889764 | A1 | * | 10/2021 | | |

OTHER PUBLICATIONS

J. Bos et al, "Frodo: Take off the ring! Practical, Quantum-Secure Key Exchange from LWE", Cryptology ePrint Archive, Report (2016).

E. Alkim et al, "Post-quantum key exchange—a new hope", Cryptology ePrint Archive, Report (2015).

E. Alim et al, "NewHope without reconciliation", Cryptology ePrint Archive, Report (2016).

J. Bos et al, "Crystals—Kyber: a CCA-secure module-lattice-based KEM", Cryptology ePrint Archive, Report (2017).

S. Bhattacharya et al, "spKEX: an optimized lattice-based key exchange", Cryptology ePrint Archive, Report (2017).

International Search Report from PCT/EP2018/077639 dated Nov. 14, 2018.

Hayo Baan et al: "Round2: KEM and PKE based on GLWR", International Association for Cryptologie Research, Dec. 5, 2017.

Markku-Juhani O Saarinen: "HILA5: On Reliability, Reconciliation, and Error Correction for Ring-LWE Encryption", IACR, International Association for Cryptologic Research vol. Sep. 24, 2017:195235 Jul. 5, 2017 (Jul. 5, 2017), pp. 1-22.

Joppe Bos et al: "Frodo Take off the Ring . . . ", Computer and Communications Security, ACM, 2 Penn Plaza, Suite 701 New York NY 10121-0701 USA, Oct. 24, 2016 (Oct. 24, 2016-10-24), pp. 1006-1018.

Ludo Tolhuizen et al: "Improved key-reconciliation method", International Association for Cryptologic Research,, vol. 2 May 2, 2017 (May 2, 2017), pp. 1-5.

Garcia Morchon "NIST Submission Framework for Lattice-Based KEM and PKE" Nov. 30, 2017.

* cited by examiner

CONFIGURABLE DEVICE FOR LATTICE-BASED CRYPTOGRAPHY

CROSS-REFERENCE TO PRIOR APPLICATIONS

This application is the U.S. National Phase application under 35 U.S.C. § 371 of International Application No. PCT/EP2018/077639, filed on Oct. 10, 2018, which claims the benefit of EP Patent Application No. EP 18165330.4, filed on Mar. 30, 2018 and EP Patent Application No. EP 17196812.6, filed on Oct. 17, 2017. These applications are hereby incorporated by reference herein.

FIELD OF THE INVENTION

The invention relates to a network node configured for a cryptographic operation, a cryptographic operation method, and a computer readable medium.

BACKGROUND OF THE INVENTION

In cryptography, a key-agreement protocol is a protocol whereby two or more parties that may not yet share a common key can agree on such a key. Preferably, both parties can influence the outcome so that neither party can force the choice of key. An attacker who eavesdrops on all communication between the two parties should learn nothing about the key. Yet, while the attacker who sees the same communication learns nothing or little, the parties themselves can derive a shared key. Key agreement protocols are useful, e.g., to secure communication, e.g., to encrypt and/or authenticate messages between the parties.

In order to facilitate secure communication among parties, key agreement protocols are sometimes further subdivided into cryptographic key-exchange (KEX) and cryptographic key-encapsulation (KEM) schemes.

KEX schemes may involve the exchange of public-keys by each party, that are then independently used by the other party along with their own secret-key to calculate the common shared secret. A well-known example of such a KEX scheme is the Diffie-Hellman key-exchange, whose security is based on solving the discrete logarithm problem. An interesting feature of some KEX schemes is that the actual final, shared secret is never exchanged between the parties, not even in encrypted form, but is calculated independently by the two parties at each end. This results in a desirable feature known as forward-secrecy, which ensures that even the compromise of a party's long-term secret-key by an attacker in the future would not compromise the secrecy of encrypted message exchanged in the past.

KEM schemes may establish a shared secret between two entities or parties using asymmetric cryptography by one party, usually the initiator of the communication, to encrypt or encapsulate (using the other party's public-key) and transmit a shared secret to the other party, known as the responder, who can then decrypt or decapsulate it (using her secret-key) and then use it for securely communicating with the initiator party. Such KEM schemes may only achieve forward-secrecy if it is ephemeral. Otherwise, any attacker that compromises a party's secret-key for a past session and has recorded all messages exchanged between the parties in that session can recover the shared secret for that particular session.

Due to increasing security needs in the Internet of Things, key-exchange schemes need to also achieve high efficiency (i.e., minimal amount of communication or bandwidth requirements) while also remaining secure, against classical as well as quantum-capable adversaries.

Recent advances indicate that quantum-computers may be feasible in a few years. Perhaps as soon as within some 5-10 years. As soon as a quantum-computer is available, most existing public-key cryptographic schemes will become unsecure since the underlying problems, on which they are based, can efficiently be solved with a quantum computer. Therefore, it is very important to design quantum-resistant public-key algorithms, i.e., public-key algorithms that cannot be broken by means of a quantum-computer.

There are several classes of quantum-resistant algorithms: lattice-based, code-based, isogeny-based, etc. In this document, we deal with quantum-resistant algorithms based on lattices. Lattice based cryptographic systems are an active area of research in which many different types of systems have been proposed. For example, the lattice may be defined in terms of a matrix of numbers, e.g., elements of some finite field, or using a polynomial, etc. The type of cryptographic operation can also vary. For example, lattice based cryptography is available for: Key encapsulation (KEM), Key exchange (KEX), Public key encryption (PKE), digital signatures, etc. Examples of those schemes are:

LWE-based KEX such as Frodo

RLWE-based KEX and CPA-KEM Newhope and NewHopeSimple.

Module-lattice-based CPA-PKE, CPA-KEM and CCA-KEM as Kyber

LWR-based KEX as spKEX

Each of the above schemes implements a cryptographic protocol (e.g., a KEX, a KEM, or PKE) relying on a single underlying problem, e.g., either Learning-with-errors (LWE), or Learning-with-rounding (LWR), or module-lattices with modules, e.g., RLWE for a fixed ring, or LWR. For example: NewHope only relies on RLWE, Kyber only relies on combining k=3 modules, each module being a polynomial in $Zq[x]/x^256+1$, spKEX only relies on LWR, Frodo only relies on LWE. The R in schemes such as RLWE refers to 'ring', or polynomial type implementations.

This poses several problems. First of all, implementing each of these systems would be a large investment. Not only would each of the schemes have to be coded, they would also each have to be debugged, to ensure that they do not contain critical bugs that could impair their security. On the other hand, not implementing all schemes, or at least the majority also implies certain risks. If one of the above problems is broken, e.g., RLWE or Module lattice, then the corresponding schemes are fully broken. It is desirable that there is some upgrade path, so that in case of a break, one can change from one type of scheme to another.

REFERENCES

[1] "Device and method sharing a matrix for use in a cryptographic protocol", European filing op 6 Mar. 2017, application Ser. No. 17/159,296.7.

[2] Ludo Tolhuizen, Ronald Rietman and Oscar Garcia-Morchon, "Improved key reconciliation method", Cryptology ePrint Archive, Report 2017/295, https://eprint.iacr.org/2017/295

[3](Frodo): J. Bos et al, "Frodo: Take off the ring! Practical, Quantum-Secure Key Exchange from LWE", Cryptology ePrint Archive, Report 2016/659, https://eprint.iacr.org/2016/659

[4] (New Hope): E. Alkim et al, "Post-quantum key exchange—a new hope", Cryptology ePrint Archive, Report 2015/192, https://eprint.iacr.org/2015/1092
[5] (New Hope Simple): E. Alim et al, "NewHope without reconciliation", Cryptology ePrint Archive, Report 2016/1157, https://eprint.iacr.org/2016/1157
[6] (Kyber): J. Bos et al, "CRYSTALS-Kyber: a CCA-secure module-lattice-based KEM", Cryptology ePrint Archive, Report 2017/634, https://eprint.iacr.org/2017/634
[7] (spKEX): S. Bhattacharya et al, "spKEX: an optimized lattice-based key exchange", Cryptology ePrint Archive, Report 2017/709, https://eprint.iacr.org/2017/709

Each one of references [1] to [7] is included herein by reference.

SUMMARY OF THE INVENTION

The inventors realized that it is possible to define a single scheme which parametrizes large classes of lattice based cryptography. Taking only a few input parameters, which change the nature of the underlying cryptography. For example, a cryptographic device as defined in the claims may receive a difficulty parameter (d), and a structure parameter (n) which together suffice to specify the type of cryptography that is used. Both the difficulty parameter (d), and a structure parameter (n) are positive integers. By increasing the difficulty parameter, the structure of the problem stays the same, but larger, and thus harder instantiations are used. A difficulty parameter is sometimes referred to as a security parameter. In embodiment, the difficulty parameter is related to the dimension of the underlying lattice. A larger value of the difficulty parameter leads to a higher dimension of the underlying lattice, and thus to a harder problem for an attacker to solve. The structure parameter is related to the amount of algebraic structure in the system. A higher value of the structure parameter implies more algebraic structure. It is conjectured that higher values of the structure parameter may be easier to attack, since the lattice has more regularity. For example, in case of advancing research finding an incrementally better way to solve lattice problems, then a user may respond by increasing the difficulty parameter. On the other hand, if advancing research find a radically better way to solve a particular type of lattice problem, then the user may respond with decreasing the structure parameter.

For example, in an embodiment a scheme is defined that can efficiently instantiate multiple underlying problems, namely RLWE, RLWR, module RLWE, module RLWR, and LWE and LWR. This does not mean that the scheme relies on two different specifications, one for Problem 1 and another for Problem 2, but that the same algorithm can be used for instantiate both problems, the only difference being the input parameters. Advantages include:

Coverage of many potential applications with a same scheme.

Minimization of implementation cost

Reduction of code size.

Preparation for a potential transition scenario in which relying on a "weaker" problem is no longer secure and new algorithms relying on a "stronger" problem is required.

The cryptographic device is an electronic device. For example, the cryptographic device may be a mobile electronic device, e.g., a mobile phone. For example, the cryptographic device may be set-top box, smart-card, computer, etc. The method of performing a cryptographic operation described herein may be applied in a wide range of practical applications. Such practical applications include financial applications, confidential or authenticated communication, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a key agreement network, FIG. 2 schematically shows an example of an embodiment of an electronic key exchange method, FIG. 3a schematically shows a computer readable medium having a writable part comprising a computer program according to an embodiment, FIG. 3b schematically shows a representation of a processor system according to an embodiment, FIG. 4a schematically shows an example of an embodiment of a public key decryption node, FIG. 4b schematically shows an example of an embodiment of a public key encryption node.

LIST OF REFERENCE NUMERALS IN FIG. 1 AND FIG. 3

Figure 1:
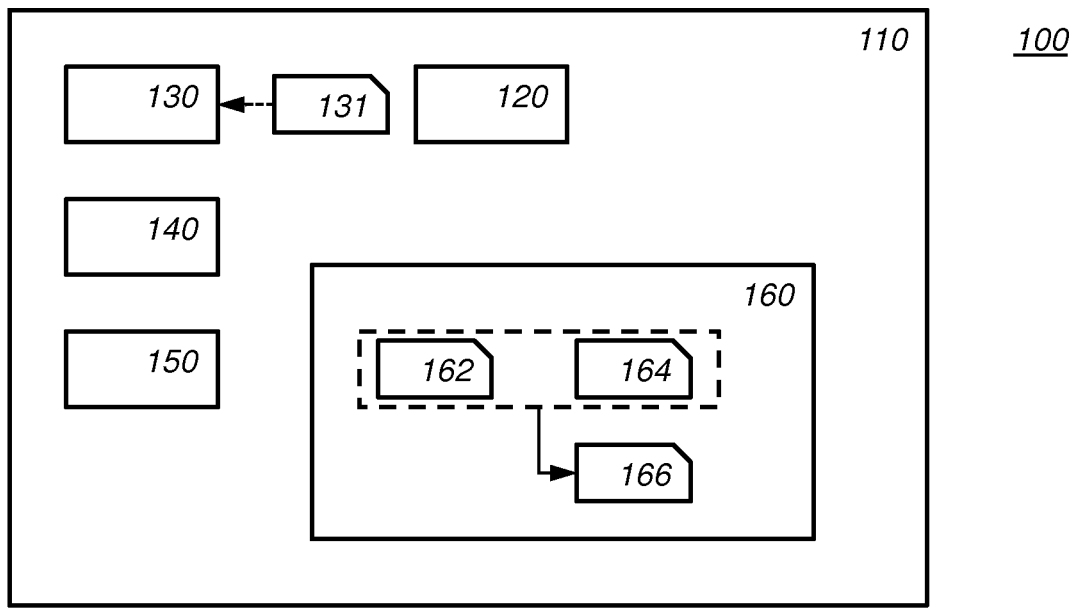
Figure 1:
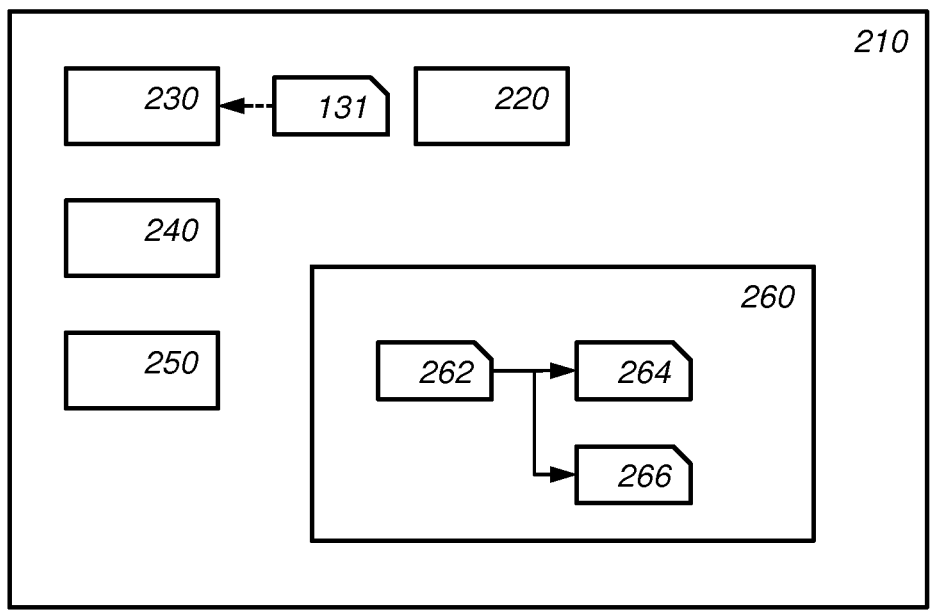

100 a key agreement network
110 a network node of initiator type
120 a communication interface
130 a shared matrix unit
131 a difficulty parameter and a structure parameter
140 a private key matrix unit
150 a public key matrix unit
160 a shared key unit
162 a raw key
164 reconciliation data (h)
166 a shared key
210 a network node of responder type
220 a communication interface
230 a shared matrix unit 240 a private key matrix unit
250 a public key matrix unit
260 a shared key unit
262 a raw key
264 reconciliation data (h)
266 a shared key
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described. In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

Recall, that there are several schemes based on lattices for the design of a key exchange (KEX) protocol, a key encapsulation mechanism (KEM; sometimes also referred to as a key encapsulation method), public-key encryption (PKE), digital signatures, etc. Examples of those schemes are:

Frodo that is a KEX based on the Learning with Errors (LWE) problem.

NewHope that is a KEX based on the Ring Learning with Errors (RLWE) problem.

NewHopeSimple that is a KEM designed for chosen plaintext attack (CPA) based on RLWE.

Kyber that is a CPA-KEM and CCA-KEM based on the module LWE problem.

spKEX that is a KEX based on the Learning with Rounding (LWR) problem.

Each of the above schemes implements a cryptographic protocol (e.g., a KEX, a KEM, PKE, digital signature) relying on a single underlying lattice problem: either LWE, or RLWE, or module-LWE for a fixed ring, or LWR.

NewHope and NewHopeSimple only rely on RLWE using ring $$\frac{Z_q[x]}{x^{1024}+1}$$

Kyber only relies on combining k modules, each module being polynomials in $$\frac{Z_q[x]}{x^{256}+1}$$

spKEX only relies on LWR

Frodo only relies on LWE

Although all the problems above are related, some of them are considered riskier in that they rely on special structures. On the other hand, the usage of a ring structure allows for smaller messages. Even though at present attacks employing such structures are unknown, such attacks might become known in future. All schemes based on those specific problems (e.g., RLWE or module LWE) would then be broken. There is thus a need for a fallback position. Thus, multiple schemes need to be implemented and tested, some based on more risky problems yet with better performance properties and some based on well-understood problems yet with a less good performance.

The inventors realized that the above lattice problems are related, and found a scheme that can instantiate all such problems, including: RLWE, RLWR, moduleLWE, module-LWR, and LWE and LWR. Below several examples are described of a cryptographic in which different lattices are created based on a difficulty parameter d, and a structure parameter n.

By changing parameters in this scheme, we can, thus, instantiate protocols (KEX, KEM, PKE, etc.) based on different underlying problems and exhibiting different performance properties.

This scheme can be applied to multiple applications with different security/performance demands. For instance, top-secret documents can be encrypted by using the scheme settings for LWE while key agreement over a resource-constrained wireless communication can be based on Ring LWR parameters. The scheme has additional advantages: first, it reduces the of code size so that less memory is required. Second, effort for code review is minimized since a single algorithm needs to be reviewed and verified. Finally, such a scheme prepares for a potential transition scenario in which relying on a "weaker" problem (e.g. RLWE) is no longer secure and new algorithms relying on a "stronger" problem (e.g., based on LWE) are required. The scheme does not rely on two different specifications, one for Problem 1 and another for Problem 2, etc., but that the same algorithm is used to instantiate different problems, the only difference being the input parameters.

The core invention uses a lattice problem of dimension d—where d is an input parameter. The lattice dimension can be the one corresponding to RLWE, RLWR, Module-LWE, Module-LWR, LWE, LWR. The scheme relies on a matrix containing kxk entries, where each entry is an element in $Z_q[x]/f[x]$ where f[x] is a reduction polynomial of degree n and n is an input parameter. k is defined to be d/n and it is not an input parameter, in embodiments it is assumed that d is a multiple of n.

Thus, given a fixed lattice dimension d and the degree of the reduction polynomial n, we can obtain the number of entries ($k^2$) of the matrix. Note that this is a key difference with module lattices. For example, in such lattices some authors optimize the ring operations in a polynomial ring (namely, $f(x)=x^{256}+1$) and they use the number of modules to "increase" the lattice dimension as d=256*k. This scheme can only be instantiated as module RLWE or RLWE that is too small for security purposes.

If n=1, then this represents a matrix for LWE or LWR.

If n=d, then this represents a matrix for RLWE or RLWR.

If 1<n<d, then this represents a matrix for module-LWE or module-LWR.

Without loss of generality, we note that in the following sections we often focus on two cases only, namely n=1 and n=d.

KEX based on LWR and NTRU-RING LWR

In the following, we will use the NTRU ring to illustrate our embodiments. In practice, other rings can be used as well such as (prime) cyclotomic polynomials taking q to be a prime ensuring that n=1 (mod p). Alternatively, we can also take (prime) cyclotomic polynomials with q being a power of two. An additional restriction is that the (prime) cyclotomic polynomial is irreducible modulo 2.

The NTRU ring is $f(x)=x^n-1$ where n is a prime number. Then for a given lattice dimension problem d, we can instantiate the system—for instance—with n=d or n=1. If n=d, then we have a NTRU-RING LWR and if n=1, then we have a LWR scheme. We can also take an input parameter d>n and d being a multiple of prime n such that we have a module-LWR using NTRU-Ring.

TABLE 1 high level KEX protocol description. Note that round(vector, p, q) indicates performing rounding using modules p and q. Note that we ignore details on how key reconciliation is done since they are not fundamental for this description. The further information below contains PKE, CPA-KEM and CCA-KEM protocols including all required details.

| Initiator | Responder |
|---|---|
| Input structure parameter n and difficulty parameter d where n + 1 is prime and n is a divisor of d Create shared matrix A with d/n × d/n entries in Z [x]/f[x] Create secret s containing d/n entries in Z[x]/f(x) Create public key b = round (A s, p, q) with d/n elements in Zp[x]/f(x), where A s is the product of the matrix A and secret vector s, computed modulo f(x) and modulo q Send (b, A) | |
| | Create secret r containing d/n elements in Z[x]/f(x) Create public key matrix u = round (r^t A, p, q) with d/n entries in Zp[x]/f(x) where r^t A is the matrix product of the transposed secret vector r and shared matrix A, computed modulo f(x) and modulo q Compute raw key rkr = (r^t b) (mod p) containing d/n entries in Zp[x]/f(x), where r^t b is the matrix product of the transposed secret vector r and matrix b, computed modulo f(x) and modulo p Compute reconciliation data (h) from rkr Send (u, h) |
| Compute raw key rki = u s (mod p) containing d/n elements in Zp[x]/f(x), where u s is the product of the public key u and secret vector s, computed modulo f(x) and modulo p Compute final key from h and rki. | |

From the above, we can see that depending on the choice of n, the underlying problem is RLWR (if n=d) or LWR (n=1). In both cases, the underlying lattice problem has dimension d. Note that the state of the art would have two different implementations of the above algorithm, namely:

TABLE 2

Note that we ignore rounding required in LWR when the public keys b and u are computed since it is not essential for the description. We also ignore details on how key reconciliation may be done, see the references.

| Initiator | Responder |
|---|---|
| LWR-based KEX (note that some operations are missing to illustrate the protocol) | |
| Create A with d × d elements in Z Create secret s, an integer vector of length d (Z^d) Create public-key b = round (As, p, q) in Z_p^d where A s is the product of matrix A and vector s, computed modulo q Send (b, A) | |
| | Create secret r in Z^d Create public-key u = round (r^t A, p, q) in Z_p^d where r^t A is computed modulo q. Compute raw key rkr = (r^t b) (mod p) in Z_p), where r^t b is the matrix product of the transposed secret vector r and matrix b, computed modulo p. Computere conciliation data (h) from rkr Send (u, h) |
| Compute raw key rki = (u s) (mod p) Compute final key from h and rki, where u s is the product of the public key u and secret vector s, computed modulo p. | |
| RLWR-based KEX (note that some operations are missing to illustrate the protocol) | |
| Create a in Zq[x]/f(x) Create secret s in Z[x]/f(x) Create public-key b = round (a*s, p, q) in Zp[x]/f(x) where * is polynomial multiplication, computed modulo f and modulo q Send (b, a) | |
| | Create secret r in Z[x]/f(x) Create public-key u = round (a*r, p, q) in Zp[x]/f(x) where a*r is computed modulo f and modulo q. Compute raw key rkr = b*r in Zp[x]/f(x), where * is polynomial multiplication, computed modulo f and modulo p. Compute reconciliation data (h) from rkr Send (u, h) |
| Compute raw key rki = u*s in Zp[x]/f(x), where * means polynomial multiplication, computed modulo f and modulo p | |

TABLE 2-continued

Note that we ignore rounding required in LWR when the public keys b and u are computed since it is not essential for the description. We also ignore details on how key reconciliation may be done, see the references.

| Initiator | Responder |
|---|---|
| Compute final key from h and rki. | |

Note that: rki, and rkr are the raw keys of the initiator and responder respectively.

As described in the background and problem statement, current schemes in Table 2 rely on a single problem and thus are optimized with slightly different parameters and algorithms. For instance, RLWE problems usually rely on ring $Z_q[x]/x^n+1$ where n is a power of two and q is a prime number so that the Number Theoretic Transform (NTT) can be used. These choices are not optimal for combining with non-ring versions since it requires q to be a prime that makes modular operations more complex when performing matrix operations.

The scheme in Table 1 is defined to work with similar parameters and routines. This is a particular reason for using the NTRU ring in this description since it relies on a q that is a power of two that is also a good choice for LWE/LWR schemes. This also allows us to use the same routine for the key reconciliation step that relies on the fact that both p and q are powers of two [2]. These details are explained in detail in the further information below explaining the embodiment for CPA-PKE, CPA-KEM and CCA-KEM.

In some embodiments, the first step of the initiator in the cryptographic protocol summarized in Table 1 may comprise PST.CPA-KEM.Keygeneration or PST.NR.CCA-KEM.Keygen, as detailed below, or any variant thereof, e.g., the key generation operation of a Key Encapsulation Mechanism. Similarly, the responder step may comprise PST.CPA-KEM.Encapsulate or PST.NR.CCA-KEM.Encapsulate, as detailed below, or any variant thereof, e.g., the key encapsulation operation of a Key Encapsulation Mechanism. The second step of the initiator may comprise PST.NR.CPA-KEM.Decapsulate, PST.NR.CCA-KEM.Decapsulate, as detailed below, or any variant thereof, e.g., the key decapsulation operation of a Key Encapsulation Mechanism (KEM). In this case, the cryptographic operation may be key exchange or key encapsulation.

In other embodiments, the first step of the initiatior in the cryptographic protocol summarized in Table 1 may comprise PST.NR.CPA-PKE.Keygeneration( ) as detailed below or any variant thereof, e.g., the key generation operation of a Public Key Encryption scheme. The step of the responder may comprise PST.NR.CPA-PKE.Encryptwithrho( ) or PST.NR.CPA-PKE.Encrypt( ), as detailed below, or any variant thereof, e.g., the encryption operation of a Public Key Encryption. The second step of the initiator may comprise PST.NR.CPA-PKE.Decrypt( ), as detailed below, e.g., the decryption operation of a Public Key Encryption scheme. In this case, the cryptographic operation may be public key encryption. In public key encryption, the step of the responder and the second step of the initiator may be repeated, e.g., to encrypt and decrypt multiple messages, and in particular, the second step of the initiator may be executed multiple times on multiple devices such that a device may perform the second step of the initiator without having performed the first step of the initiator before.

Further embodiments are described in detail with reference to FIG. 1 below.

Note that in the protocol explained in Table 1 we have references to round ( ) that is a function that performs rounding as defined in the LWR problem. In particular, rounding may comprise the steps of multiplying an unscaled entry with p and dividing by q, rounding to an integer (e.g., the nearest integer), and taking the rounded entry modulo p, which effectively adds noise to the entry.

Reference Implementation (Part 1)

A reference implementation of the scheme in Table 1 would have the following routines for obtaining the public-key elements (b and u) and raw keys (rki and rkr):

Computation of Public-Keys:

```
Result[ ] = Computation of public-key(A[,],s[ ])
    Result[ ] = 0
For (i=0 to d/n)
    For (j=0 to d/n)
        Result[i] = Add_elements(Result[i], Multiply_elements[A[i,j],s[j]])
    C[ ]=Add_elements(A[ ],B[ ])
        For(i=0 to n)
            C[i]=(A[i]+B[i] (mod q))
    C[ ]=Multiply_elements(A[ ],B[ ])
    C[ ] =0
        For(i=0 to n)
            For (j=0 to n)
                C[i]=C[i]+ A((i−j)mod n)*B[j] mod q
```

Note that in the above routines we do not include the rounding step using moduli p and q as in Table 1. However, this is not essential to this invention. If we were doing a LWE version of this scheme, the rounding would be substituted by the addition of noise (e.g., Gaussian noise of mean 0 and small standard deviation) in $Z\_q[x]/f(x)$.

Computation of Raw-Keys:

```
Result[ ] = Computation of raw-key(b[ ],s[ ])
    Result[ ] = 0
For (i=0 to d/n)
        Result[i] = Add_elements(Result[i], Multiply_elements[b[i],s[i]])
    C[ ]=Add_elements(A[ ],B[ ])
        For(i=0 to n)
            C[i]=(A[i]+B[i] (mod p) (mod x^n−1)
    C[ ]=Multiply_elements(A[ ],B[ ])
```

```
For(i=0 to n)
    C[i]=(A[(n-i)mod(n)]+B[i]) (mod p) (mod x^n-1)
```

Note that in the algorithms for raw-key computation we write mod p since we consider Learning with Rounding. For a (ring) learning with errors version of this invention, we would add noise instead of performing rounding and computations would be modulo q Reference Implementation (Part 2)

We note that the secrets associated to initiator and responder in a protocol (KEX, KEM, PKE, etc.) can be more than a single vector containing d/n elements in $Zq[x]/f(x)$, but can contain n_bar and m_bar of those vectors. For example, the secret s may be a private matrix, e.g., a private key matrix, the public key b may be a public matrix, e.g., a public key matrix, the secret r may be a private matrix, e.g., a private key matrix, and the public key u may be a public matrix, e.g., a public key matrix. Having n_bar and m_bar greater than one is preferred in order to generate enough key bits. Thus, all operations in the scheme in a reference implementation can be represented as the multiplication of two matrices whose elements are in $Zq[x]/f(x)$. In particular, to compute b, a matrix product may be computed between the A and the s, to compute u, a matrix product may be computed between the A and the r, and to compute rkr, a matrix product may be computed between b and r, or between b and s.

For this, the following generic function is required:

C=Multiply(A,B,A_c,A_r,B_c,B_r,n)

where A and B are the input matrices of dimensions (A_c× A_r) and (B_c×B_r) respectively. Each entry in the matrix contains an element in $Zq[x]/f(x)$, which can be represented as n elements in Zq. The output matrix C has dimension (C_c×C_r)=(A_r×B_c).

Furthermore, in some cases, it is required a function to transpose the matrices. For this, we require a function:

B=Transpose(A,A_c,A_r,n)

where A is the input matrix of dimensions (A_c×A_r). Each element in the matrix contains an element in $Zq[x]/f(x)$, which can be represented as elements in Zq. The output matrix B has dimension (B_c×B_r)=(A_r×A_c).

A particular way of encoding the information in a matrix is by using a vector that stores at the lowest level elements in Zq. For instance, if q=2^14, then two bytes can be used to store each element. A matrix A of dimension (A_r×A_c) with elements in $Zq[x]/f(x)$ can be stored in a vector of length A_r*A_c*n*2 bytes (where we assume that q<=2^16). This vector would encode A: (i) row by row, (ii) in each row column by column, and (iii) then the n elements in Zq.

The above two functions (Multiply( ) and Transpose( )) would access the vector used to store the matrices in the suitable way. This is also the reason why n is passed as input parameter to those two functions.

Optimized Implementation of the Public-Key Computation (Part 1):

For a fixed security parameter d, the above reference implementation is fast for the case n=d since the A matrix contains a single entry that is a polynomial in $Zq[x]/x^n-1$ assuming that n_bar=m_bar=1. For n=1, a reference implementation will be slow since A contains $d^2$ entries, each entry being an element in Zq and scalar multiplication is realized as a generic polynomial multiplication.

For an optimized implementation, we can exploit the fact that in the case n=d, polynomial multiplications operations can be expressed as the multiplication of a d×d=n×n matrix over Zq and a vector of length d with entries from Zq:

$$a*s = \begin{pmatrix} a_0 & a_{n-1} & \ldots & a_1 \\ a_1 & a_0 & \ldots & a_2 \\ \ldots & \ldots & \ldots & \ldots \\ a_{n-1} & a_{n-2} & \ldots & a_0 \end{pmatrix} \begin{pmatrix} s_0 \\ s_1 \\ \ldots \\ s_{n-1} \end{pmatrix}$$

Using this fact, when implementing the public-key computation, we can always assume an input matrix A, e.g., represented as an expanded shared matrix, that will contain $d^2$ different elements for n=1 (LWR) and d different elements for n=d (RLWR). In other words, the expanded shared matrix may have a number of columns and rows equal to the difficulty parameter d, and may be computed by replacing polynomial entries with the above circulant matrix. The only difference between the algorithms when performing the matrix multiplications is that the matrix multiplication for the responder is from the left for n=1 and from the right for n=d. In other words, a common matrix multiplication part may be used for different values of the structure parameter and/or difficulty parameter.

Alternatively, the coefficients of polynomials can be organized as row vectors, and we use that $$a*s = (s_0, s_1, \ldots, s_{n-1}) \begin{pmatrix} a_0 & a_1 & \ldots & a_{n-1} \\ a_{n-1} & a_0 & \ldots & a_{n-2} \\ \ldots & \ldots & \ldots & \ldots \\ a_1 & a_2 & \ldots & a_0 \end{pmatrix}$$

Optimized Implementation of the Public-Key Computation (Part 2)

As disclosed in a related Philips filing [1], A can be efficiently refreshed given a master matrix A_master by applying a permutation. The permutation can, e.g., be a cyclic shift (by a random offset (between 0 and n−1) of a number n' (0<=n'<n) of the rows in A_master.

A natural extension of this is to consider A_master as a vector a_master of length L and apply a permutation on it to obtain the rows of A. We differentiate three cases with very specific permutations:

Case 1: $L=d^2$ and the permutation to obtain row i of A comprises taking the d consecutive elements starting in position i*d of $a_{master}$ and cyclically rotating them a random offset between 0 and d−1.

Case 2: L≈q and the permutation to obtain row i of A comprises taking the d consecutive elements, starting in element $e_i$ of $a_{master}$ where $e_i$ is a randomly chosen value in [0, L−1] and ending in element $e_i$+d (mod L) (thus, considering also a cyclic structure).

Case 3: L=d and the permutation to obtain row i of A comprises taking the d consecutive elements (considering also a cyclic structure) starting in element i of $a_{master}$.

Obviously, the above three cases can be further generalized by using other types of permutations or making $L>d^2$. For the three cases in this approach:

Case 1 implements the scheme described in this document for n=1. If $a_{master}$ is computed randomly, then the resulting A cannot be differentiated from a random matrix. Since elements are rotated by a random offset, then given fixed a_master, this approach can efficiently obtain a fresh A.

Case 3 implements the scheme for n=d and provides an efficient way for obtaining the matrix representation of a in the polynomial convolution a*s.

Case 2 is a case between a ring structure and a non-ring structure. For this case, it is not possible to have a reduction to (LWR) since there will be some overlap between the rows in A since $L<d^2$. Thus, it is possible to distinguish the resulting matrix A from a random one. However, from a practical point of view, this approach destroys the single ring structure in the resulting A since it contains many more elements. Effectively, each row is using a different ring.

If we incorporate the above approach to the optimized implementation (Part 1), we can implement the matrix multiplication in terms of $a_{master}$ of a given length L, a permutation of some specific features and the secret s. Depending on the choice of the length L and the permutation, the same algorithm implements efficiently the matrix multiplication for both n=1 and n=d.

We note that in case 1, a_master can be re-used, it and fresh matrices A are obtained by varying the row permutations. In case 3, it is advisable to regularly update a_master.

This is summarized in the following table in which we observe that depending on the choice of L, we can obtain different performances and security assurances. We observe that taking L=q does not have benefits from bandwidth point of view, since structure is destroyed and more information needs to be transmitted to convey A; however CPU-wise, the approach is more efficient since fewer random numbers need to be computed.

| Value of L | Corresponds to | Problem reduces to | Performance (bandwidth) | Performance (CPU) |
|---|---|---|---|---|
| d | n = d | RLWR | As of RLWR | As of RLWR |
| q | n = 1 | RLWR | As of LWR | Close to RLWR |
| d^2 | n = 1 | LWR | As of LWR | As of LWR |

Optimized Implementation (Part 3)

The same permutation idea can be applied to the computation of the raw key knowing that in both cases the public-key contains d elements in Zp. For n=1, those are in fact d elements in $Zp=Zp[x]/x-1$. For n=d, those d elements are the coefficients of a polynomial in $Zp[x]/x^d-1$.

For n=1, the d elements of the received public key are processed in the received order, but for the case n=d, the d elements first need to be rearranged to resemble the order of the first row of the matrix that would implement the polynomial evaluation. Then we can define two transformations:

$$T_{n=1} = \begin{pmatrix} 1 & \ldots & 0 \\ \ldots & \ldots & \ldots \\ 0 & \ldots & 1 \end{pmatrix}$$

$$T_{n=d} = \begin{pmatrix} 1 & 0 & \ldots & 0 \\ 0 & 0 & \ldots & 1 \\ \ldots & \ldots & \ldots & \ldots \\ 0 & 1 & \ldots & 0 \end{pmatrix}$$

Furthermore, we consider that two permutations are applied to obtain a matrix resembling the polynomial multiplication $$P_{n=1} = \begin{pmatrix} 1 & \ldots & 0 \\ \ldots & \ldots & \ldots \\ 0 & \ldots & 1 \end{pmatrix}$$

$$P_{n=d} = \begin{pmatrix} 0 & 0 & \ldots & 1 \\ \ldots & \ldots & \ldots & \ldots \\ 0 & 1 & \ldots & 0 \\ 1 & 0 & \ldots & 0 \end{pmatrix}$$

Given this, an optimized algorithm to obtain the raw key works as follows:

```
Result[ ] = Computation of raw-key(b[ ],s[ ])
    Result[ ] = 0
    For (i=0 to n)
        For j=0 to d
            Result[i] = Result[i] + T_n(b)[(P_n(j)+i)mod(d)] * s(j)
```

Note that $T_d$ is required as we receive the coefficient vector $b=(b_0, b_1, \ldots b_{n-1})^T$ and need to obtain the top row of the circulant matrix with b as leftmost column.

In the above algorithm, $T_n$ acts on b to rearrange the elements properly and $P_n$ performs a shift on $T_n(b)$ to perform the module reduction operations.

Optimized Implementation (Part 4)

A key aspect for the optimized implementation is the realization of the permutation on a_master. This requires realizing reductions modulo L and modulo d. This has drawbacks regarding performance and side-channel attacks. To avoid these modular reductions, e.g., on a vector v:

$$v[(i+P[j])(\text{mod } d)]$$

the optimized implementation can work with a vector v_star that just contains a copy of vector.

$$v\_star=v|v$$

Where | represents concatenation. This increases the memory requirements but avoids the modular reduction.

We also note that this approach can allow implementing other rings in an efficient way. For instance, if we used ring $Zq[x]/x^n+1$ then v_star would be obtained as:

$$v\_star=v|-v$$

Indeed, then we would have that $$a*s = \begin{pmatrix} a_0 & -a_{n-1} & \ldots & -a_1 \\ a_1 & a_0 & \ldots & -a_2 \\ \ldots & \ldots & \ldots & \ldots \\ a_{n-1} & a_{n-2} & \ldots & a_0 \end{pmatrix} \begin{pmatrix} s_0 \\ s_1 \\ \ldots \\ s_{n-1} \end{pmatrix}$$

So A has minus signs above the diagonal; in fact $A(i,j) = a_{i-j}$ if $i \geq j$ and $A(i,j) = -a_{n+i-j}$ if $i<j$. As $a_0 = A(0,0)$ and $a_k = -A(0,n-k)$ for $1 \leq k \leq n-1$, it follows that $A(i,j) = -A(0,n-i+j)$ if $i>j$ and $A(i,j) = A(0,j-i)$ if $j \geq i$. So $A(i,j) = v(n-i+j)$ where $v(k) = -A(0,k-n)$ if $k<n$ and $v(k) = A(0,k-n)$ for $k \geq n$.

CPA-PKE, CPA-KEM and CCA-KEM Based on LWR and NTRU-RING LWR

The further information below describes how to construct CPA-PKE, CPA-KEM and CCA-KEM protocols based on the ideas described so far. These protocols can thus be instantiated to rely on LWR and NTRU-RING LWR just by using different configuration parameters.

The NTRU ring has reduction polynomial $f(x) = x^n - 1$ where n is a prime number. Then for a given lattice dimension problem d, we can instantiate the system with n=d or n=1. If n=d, then we have a NTRU-RING LWR and if n=1, then we have a LWR scheme.

We note that even if the description uses as input parameters (d,n) either (d,d) or (d, 1), we can also have an even more general configuration in which the input parameters are (k*n,n) where n can be either 1 or a prime number (in the case of the NTRU Ring).

OTHER EMBODIMENTS

We note that the description does not rely on the type of secret or on the fact of using rounding or standard addition of noise (either Gaussian, uniform, or of any other distribution). Thus, this invention can be implemented for any type of secret distribution.

Applicability to RLWE: The further information below contains specific choices for the NTRU ring and takes p and q to be power of two. These choices are motivated by the specific type of key reconciliation method and the fact that having p and q as power of two leads to a more efficient implementation. Alternative embodiments apply the ideas in this document to R/LWE. In this case, noise needs to be added instead of applying rounding.

Applicability to other protocols: we have shown in this document how to apply our design in the construction of KEX, KEM, or PKE. The same methodology also works for El-Gamal like type of schemes. The scheme can also be applicable to other schemes such as signatures.

Usage of Other Rings

Most of the embodiments in this document are based on the NTRU ring $f(x) = x^n - 1$. However, this polynomial is not irreducible and equals $(x-1)(x^{(n-1)} + x^{(n-2)} + \ldots + x + 1)$. This makes the RLWE decision problem (b=as +e) easy to solve. Still, finding s remains hard.

Literature uses other rings that can be used in the above embodiments. For instance, it is possible to use cyclotomic rings of the form $x^n + 1$ where n is a power of two and q is a prime number and $q \equiv 1 \pmod{n}$. It is also possible to use prime cyclotomic rings of the form $f(x) = x^{n'-1} + x^{n'-2} + \ldots + x + 1$ and q a prime number and $q \equiv 1 \pmod{n'}$. In this case, the structure parameter n may be one less than the prime n' defining the prime cyclotomic ring, such that integer polynomials of degree less than the structure parameter may be used in the cryptographic operation.

We can use these rings in a similar way as we have shown above for the NTRU ring. For instance, the non-ring case (LWE) is then implemented with ring $(x^{n'-1} + 1)$ or (1) when n=1 for above cyclotomic rings. Note that in both cases q is a prime number. We note that the key reconciliation method is different to the one used in the embodiment detailed above since it requires q to be a power of two. A suitable choice would be a key reconciliation as the one in Frodo.

Another good option is to use cyclotomic polynomials as the above, namely $x^n + 1$ and $x^{n-1} + x^{n-2} + \ldots + x + 1$ and use a q that is a power of two instead of being a prime number. The requirement on q being a prime is mainly to use the NTT, however, for an implementation of our scheme, choosing q to be a power of two is better since a good option is to implement the scheme by means of matrix multiplications.

Another good option is to use cyclotomic polynomials as the above, namely $x^n + 1$ and $x^{n'-1} + x^{n'-2} + \ldots + x + 1$ and use a q that is a power of two with the additional requirement that the polynomial is irreducible modulo 2 and the structure parameter n may be one less than the prime n' such that integer polynomials of degree less than the structure parameter may be used in the cryptographic operation.

We also note that if the prime cyclotomic polynomial is used, $x^{n-1} + x^{n-2} + \ldots + x + 1$, then operations can still be carried out in the ring $x^n - 1$ since both rings only differ a term $x - 1$. To this end, it is only required to lift the values from one ring to the other one by multiplying by $x - 1$. Once operations are realized, we can go back to the previous ring by dividing by the same amount.

Rationale of Parameter Choices from a Performance Viewpoint

Some computational optimizations known for RLWE cannot be applied to some embodiments presented in this document. In particular, it is not possible to apply the NTT to the NTRU ring. An alternative would be to use NTT friendly parameters such as n a power of 2 and q prime numbers so that operations in $Z_q[x]/f(x)$ where $f(x) = x^n + 1$ can be performed by means of the NTT. This optimization would speed up CPU performance for the ring case (n>1) due to the usage of NTT, however, we expect a worse performance for the non-ring case (n=1) since operations would be modulo q (q being a prime number).

The parameter choices presented in this document seem to be the best ones for a combined scheme since it allows for a fast implementation of operations when performed by means of matrix/vector operations applicable to any choice of n. In other words, even if scheme for n>1 might not be as efficient as it could be another ring scheme using NTT, the choice in this document allows for a very fast implementation of the scheme when n>1 but also when n=1. Furthermore, the usage of NTRU rings allows for a fine-tuning of security and bandwidth requirements since there are many suitable rings.

Parameters

The scheme can be configured with different parameters. The values of d and q and p define the difficulty of the underlying lattice problem. Exemplary values are for instance a d of around 700 and q and p equal to $2^{14}$ and $2^{11}$. In this case, n_bar and m_bar can be equal to 8 so that 4 bits can be obtained from each coefficient for the resulting key matrix in a KEX when n=1. When n=d, then a single bit is required per polynomial coefficient so that the q can be made smaller, and therefore also the p, and therefore also the n. Since a polynomial has n coefficients, then a key of n bits is obtained and n_bar and m_bar only need to be equal to one.

We note that for some choices of rings, we can have multiple sets of parameters. For instance, if we take the prime cyclotomic polynomials, we can have the following classes of parameters:

Parameters for n=1 and n=d determining whether the underlying problem is based on a ring structure or not.

q being a prime number or a power of two determining the type of optimizations that are feasible from a CPU point of view.

Configurability of the Scheme

The scheme can be configured for different security levels and underlying hard-problem as follows:

First, for each of the underlying problems (e.g., LWR or RLWR), a computer program computes the target parameters (mainly, d, n, q and p) to achieve a given security level and performance in terms of failure probability, bandwidth and CPU. This task can be executed a single time and then parameters can be published.

Second, the sets of published parameters are stored in a table together with the program implementing the scheme proposed in this document, each set of parameters corresponding to a given underlying problem, security level, and performance parameters.

Third, when two parties (e.g., Alice and Bob) wish to communicate with each other, Alice informs Bob about the set of parameters that she is willing to use. This means that Alice can determine whether she wants to use the scheme, e.g., in ring or non-ring mode (d and n choices) and at which security level (dependent on d, q, and p). Alice can inform Bob about her choice by explicitly specifying the set parameters (d, n, q, p, . . . ), by sending an identifier of the set of parameters, or by specifying performance values (e.g., size of public-key, size of private-key . . . ) that depend on the chosen parameters. We note that Bob can then also have a policy that requires not only a minimum-security level, but also a certain hard problem. Thus, if the proposal from Alice is not satisfactory, then Bob can request a different set of parameters.

Below is further information regarding the above, and further embodiments, from a more mathematical point of view.

1 Algorithm Specifications and Supporting Documentation
1.1 Design Rationale
1.2 Underlying Problems
1.3 Preliminaries
1.4 CPA Public-Key Encryption
1.5 CPA Key Encapsulation Mechanism for the Non-Ring case
1.6 CCA Key Encapsulation Mechanism Framework for the Non-Ring case
1.7 Non-ring and ring case combined
   1.7.1 Framework Configurations
   1.7.2 Parameter sets
   1.7.3 NIST Levels
1 Algorithm Specifications and Supporting Documentation
1.1 Design Rationale Some embodiments relate to a framework of algorithms to enable Key Encapsulation. The proposed algorithms fall under the category of lattice-based cryptography, in particular, they may rely on the Learning with Rounding (LWR) problem. This problem has been chosen for the design of the algorithms due to its extensive study and its advantageous performance properties, e.g., reduced bandwidth requirements.

An interesting feature of some embodiments is that the framework has been designed to instantiate the LWR problem and the Ring LWR (RLWR) in a seamless way. This means that the same algorithms (and code) can be used to efficiently instantiate LWR- or RLWR-based algorithms. The rationale of this choice is manifold.

First, this allows adapting to multiple environments in a simple way: on the one hand, LWR-based algorithms can be applied to environments in which performance is less of an issue, but security is the priority so that it is preferred to not have the additional ring structure. On the other hand, RLWR-based algorithms achieve the best performance in terms of bandwidth and computation so that they better fit in more constrained environments.

Second, this approach enables a migration strategy from ring-based schemes to non-ring schemes from day one. This makes sure that if attacks on ring-based schemes are found in the future, due to the underlying ring structure, then an alternative secure solution is already available and deployed.

Third, the proposed framework reduces maintenance and code analysis since the same implementation instantiates the RLWR and LWR cases for all algorithms CPA-KEM, CCA-KEM and CCA-PKE.

Embodiment further optimize performance by means of several differentiating features. First of all, the usage of LWR and RLWR optimizes bandwidth performance and avoids sampling routines. Second, sparse ternary secrets are chosen since they ease implementation, allow for improved performance, and reduce failure probabilities. Third, in order to prevent pre-computation attacks, the public matrix A is not kept constant, but is renewed in a very efficient way to minimize performance degradation due to its re-computation during a handshake. Fourth, functionality for performing rounding, message compression, and decryption is instantiated by means of the same function. This simplifies and optimizes the design. Fifth, the ring version of this proposal relies on the NTRU Ring due to its good performance features.

1.3 Preliminaries

We denote the polynomial ring $Z[x]/(x^n-1)$ by $R_n$. Here, n is a structure parameter and $x^n-1$ is a reduction polynomial with degree equal to the structure parameter such that polynomials may be used with degree less than the structure parameter. We will allow that n=1; then $R_n$=Z. By abuse of notation, for each positive integer $\alpha$, we write $Z_\alpha$ for the set $\{0,1, K, a-1\}$, and $R_{n,a}$ for the set of polynomials of degree less than 1 with all coefficients in $Z_a$. We call a polynomial in $R_n$ trinary if all its coefficients are 0, 1 or −1.

Throughout this document, regular font letters denote elements from $R_n$, and bold lower-case letters represent vectors with coefficients in $R_n$. All vectors are column vectors. Bold upper case letters are matrices. The transpose of a vector or a matrix A is denoted by $v^T$ or $A^T$.

Modular reductions For a positive integer $\alpha$ and $x \in Q$, we define $\{x\}_\alpha$ as the unique element x' in the interval $(-\alpha/2, \alpha/2]$ satisfying x'≡x(mod $\alpha$). Moreover, we define $\langle x \rangle_\alpha$ as the unique element x' in the interval $[0, \alpha-1]$ such that x≡x'(mod $\alpha$).

Rounding For $x \in Q$, we denote by $\lceil x \rfloor$ rounding of x to the closest integer, with rounding up in case of a tie.

Compression and decompression Let a, b be integers such that a>b. We define functions $\text{Compress}_{a,b}: Z_a \to Z_b$ and $\text{Decompress}_{a,b}: Z_b \to Z_a$ as $$\text{Compress}_{a,b}(x) = \left\langle \left\lceil \frac{b}{a} \cdot x \right\rfloor \right\rangle_b, \text{ and } \text{Decompress}_{a,b}(x) = \left\langle \left\lceil \frac{a}{b} \cdot x \right\rfloor \right\rangle_a$$

Hence, the Compress function may be used to add noise, e.g., to the entries in a matrix, e.g., a matrix product. For example, adding noise to an unscaled value x may comprise multiplying the unscaled entry with a modulus b, dividing by a modulus a, rounding to an integer (e.g, the nearest integer), and taking the rounded entry modulo the second modulus. It can be shown $\text{Decompress}_{a,b}$ is "nearly" the inverse of $\text{Compress}_{a,b}$. To be more precise, for each $x \in Z_a$, $$\left|\{Decompress_{a,b}(Compress_{a,b}(x)) - x\}_a\right| \leq \frac{a+1}{2b}.$$

By direct computation it can be seen that if a is a multiple of b, then $$Decompress_{a,b}(Compress_{a,b}(x)) = x + \{x\}_{b/a} \pmod{a}$$

for each $x \in Z_a$.

The compress function serves three purposes.

First, it improves security since it leads to the Learning with Rounding problem.

Second, it is used to decrypt a message.

Third, it reduces the sizes of public keys and ciphertexts, thus reducing on bandwidth requirements.

For each $v \in R_n$, the Hamming weight of v is defined as its number of non-zero coefficients. The Hamming weight of a vector in $R_n^k$ equals the sum of the Hamming weight of its components. We denote with $H_{n,k}(h)$ the set of all vectors $v \in R_n^k$ of trinary polynomials of Hamming weight h. By considering the coefficients of a polynomial in $R_n$ as a vector of length n, a polynomial in $H_{n,k}(h)$ corresponds to a trinary vector of length nk with non-zeros in h positions, so that $H_{n,k}(h)$ has $$\binom{nk}{h} 2^h$$

elements.

For $v = \sum_{i=0}^{n-1} v_i x^i \in R_n$, we define $\|v\|_\infty$ as the largest absolute value of its coefficients, that is, $$\|v\|_\infty = \max\{|v_i| \mid 0 \leq i \leq n-1\}.$$

It is easy to see that for all a, $b \in R_n$, we have that $$\|ab\|_\infty \leq n \cdot \|a\|_\infty \|b\|_\infty.$$

Similarly, if V is a matrix of polynomials in $R_n$, then $\|v\|_\infty$, is the largest of all coefficients of the polynomials in V. Finally, for $\mu \leq ab$ and $C \in Z^{a \times b}$, the vector $Sample_{\mu,a,b}(C) \in Z_p^\mu$ comprises the values in $\mu$ pre-specified positions of C.

1.4 CPA Public-Key Encryption

In this section, we describe Public-Key Encryption for the non-ring case. Our CPA-secure public-key encryption scheme is described with the algorithms below. These algorithms assume knowledge of various system parameters, viz positive integers n, h, p, q, t, B, $\bar{n}$, $\bar{m}$, $\mu$. The algorithms include random choices, for a matrix $A \in Z_q^{n \times n}$, as well as for an $n \times \bar{n}$ matrix S and for a $n \times \bar{m}$ matrix R, both having all columns in $T_n(h)$. That is, both S and R are trinary matrices for which each column has Hamming weight h. To make the choice for A explicit, the system parameters include a randomness space $\Sigma$ and a mapping $f: \Sigma \to Z_q^{n \times n}$. Similarly, to make the choices for S and R explicit, we define functions $f_S$ and $f_R$ that assign, on an input from $\{0,1\}^{rs}$ and $\{0,1\}^{rR}$, respectively, generate trinary $n \times \bar{n}$ and $n \times \bar{m}$, respectively, with each column having Hamming weight h. For a set A, we denote by $$a \xleftarrow{\$} A$$

that a is drawn uniformly from A.

The first algorithm generates a public key pk in $\Sigma \times Z_p^{\bar{n}}$, and a secret key $sk \in T_n(h)^{\bar{n}}$, i.e., a trinary $n \times \bar{n}$ matrix of which each column has Hamming weight h.

Algorithm 1: PST.NR.CPA-PKE.Keygeneration( )

Parameters Integers p, q, n, h, $\bar{n}$

Input-

Output $pk \in \Sigma \times Z_p^{n \times \bar{n}} sk \in (T_n(h))^{\bar{n}}$ $\sigma \xleftarrow{\$} \Sigma$ $A = f(\sigma)$ $s \xleftarrow{\$} \{0, 1\}^{rs}$ $S = f_S(s)$ $B = Compress_{q,p}(\langle AS \rangle_q)$ $pk = (\sigma, B)$ $sk = S$ return $(pk, sk)$ The next algorithm generates from a public key pk, a message m and a randomness variable $\rho$ a cipher text C.

Algorithm 2: PST.NR.CPA-PKE.Encryptwithrho($pk, m, \rho$)

Parameters Integers p, t, q, n, $\bar{m}$, $\bar{n}$, $\mu$

Input $pk = (\sigma, B) \in \Sigma \times Z_p^{n \times \bar{n}}, m \in Z_{2^B}^\mu, \rho \in \{0, 1\}^{rR}$ Output $c = (U, v) \in Z_p^{n \times \bar{m}} \times Z_t^\mu$ $A = f(\sigma)$ $R = f_R(\rho)$ $U = Compress_{q,p}(\langle A^T R \rangle_q)$ $v = Compress_{p,t}\left(\left\{Sample_\mu(B^T R) + \lceil \frac{p}{2^B} \rceil \cdot m\right\}_p\right)$ $c = (U, v)$ return $c$ The encryption algorithm generates from a public key pk and a message m a ciphertext C.

Algorithm 3: PST.NR.CPA-PKE.Encrypt($pk, m$)

Parameters Integers p, t, q, n, $\bar{m}$, $\bar{n}$, $\mu$

Input $pk = (\sigma, B) \in \Sigma \times Z_p^{n \times \bar{n}}, m \in Z_{2^B}^\mu$ Output $c = (U, v) \in Z_p^{n \times \bar{m}} \times Z_t^\mu$ $\rho \xleftarrow{\$} \{0, 1\}^{rR}$ $c = PST.NR.CPA-PKE.Encryptwithrho(pk, m, \rho)$ return $c$ The decryption algorithm retrieves, from a secret key sk and a ciphertext C, an (estimate for) the plaintext message m.

---
Algorithm 4: PST.NR.CPA-PKE.Decrypt(sk,c)
---
Parameters Integers $p,t,q,n,\bar{m},\bar{n},\mu$
Input sk = $\mathbf{S} \in (T_n(h))^{\bar{n}}$, c = $(\mathbf{U}, \mathbf{v}) \in \mathbf{Z}_p^{n \times \bar{m}} \times Z_t^\mu$
Output $\hat{m} \in \mathbf{Z}_2^{\mu B}$
$\mathbf{v}$=Decompress$_{p,t}(\mathbf{v})$
$\hat{m}$ =Compress$_{p,2}^B$($\mathbf{v}$–Sample$_\mu(\mathbf{S}^T\mathbf{U})$)
return $\hat{m}$
---

1.5 CPA Key Encapsulation Mechanism for the Non-Ring Case

The following three algorithms build on the public-key encryption scheme defined in a previous section to define a CPA-secure key encapsulation mechanism. It employs a hash function H: $\{0,1\}^* \to \{0,1\}^{\mu B}$.

Note We could also have an additional hash function G: $\{0,1\}^* \to \{0,1\}^\kappa$, and apply G instead of H in steps 4 of the encapsulation algorithm and step 2 of the decapsulation algorithm.

---
Algorithm 5: PST.CPA-KEM.Keygeneration( )
---
Parameters Integers $p,q,n,h,\bar{n}$
Input
Output pk $\in \Sigma \times \mathbf{Z}^{n \times \bar{n}}$, sk $\in (T_n(h))^{\bar{n}}$
( pk , sk ) = PST.NR.CPA-PKE.Keygeneration( )
return ( pk , sk )
---

As shown in Algorithm 5, key generation for a key encapsulation mechanism may be performed by performing the key generation of a public key encryption scheme, e.g., PST.NR.CPA-PKE.

Algorithm 6: *PST.CPA-KEM.Encapsulate* (*pk*)

Parameters Integers $p, t, q, n, \bar{m}, \bar{n}, \mu, \alpha$

Input $pk = (\sigma, B) \in \Sigma \times Z_p^{n \times \bar{n}}$

Output $c = (U, v) \in Z_p^{n \times \bar{m}} \times Z_t^\mu$, $K \in Z_{2B}^\mu$ $a \xleftarrow{\$} \{0, 1\}^\alpha$ $m = H(a, pk)$ $c = PST.NR.CPA\text{-}PKE.Encrypt(pk, m)$ $K = H(m, c)$ return $(c, K)$ As shown in Algorithm 6, key encapsulation may comprise encrypting m, which may be a shared key, using a public-key encryption scheme, e.g., PST.NR.CPA-KE. In this algorithm, the bits of m are input to a cryptographic hash function to derive the outcome K of the key encapsulation mechanism, here in combination with c; alternative ways of using the shared bits, e.g., as input to a key derivation function, are discussed below.

Algorithm 7: PST.NR.CPA-KEM.Decapsulate( sk,c )

---
Parameters Integers $p,t,q,n,\bar{m},\bar{n},\mu$
Input sk = $\mathbf{S} \in (T_n(h)^{\bar{n}}$, c = $(\mathbf{U}, \mathbf{v}) \in \mathbf{Z}_p^{n \times \bar{m}} \times \mathbf{Z}_t^\mu$
Output K $\in \mathbf{Z}_2^{\mu B}$
m = PST.NR.CPA-PKE.Decrypt( sk, c )
K = H ( m,c )
return K
---

As shown in Algorithm 7, key decapsulation may comprise decrypting a ciphertext c of a public-key encryption scheme, e.g., PST.NR.CPA-PKE, to obtain plaintext m, where m may be shared key, and m is shared between the node performing the encapsulation and the node performing the decapsulation. Again, m may be used to derive outcome K of the key derivation function with a cryptographic hash, as shown in Algorithm 7, or using other techniques such as a key derivation function, as discussed below.

Remark Note that in Algorithms 6 and 7, we implicitly map pk and c to a bitstring before feeding them to H.

1.6 CCA Key Encapsulation Mechanism Framework for the Non-Ring Case

The Key Encapsulation framework is obtained by applying a KEM variant of the Fujisaki-Okamoto transform to our encryption scheme to make it CCA-secure.

We use the notation from the CPA-PKE scheme. We also need two hash functions, $G: \{0,1\}^* \to \{0,1\}^\beta \times R_R \times \{0,1\}^\gamma$, and $H: \{0,1\}^* \to K = \{0, 1\}^\kappa$.

We first describe the key generation algorithm. Note that in case of equal randomization choices, the public keys pk are equal; the secret key with Algorithm 8 comprises the secret key, as well as the public key and a random string (z).

Algorithm 8: *PST.NR.CCA-KEM.Keygen*( )

Parameters Integers $p, q, n, h, \bar{n}, \zeta$

Input

Output $pk \in \Sigma \times Z_p^{n \times \bar{n}}$, $sk \in (T_n(h))^{\bar{n}} \times \{0, 1\}^\zeta$ $(pk_{CPA-PKE}, sk_{CPA-PKE}) = PST.NR.CPA\text{-}PKE.Keygen( )$ $z \xleftarrow{\$} \{0, 1\}^\zeta$ $pk = pk_{CPA-PKE}$ $sk = (sk_{CPA-PKD}, z)$ return $(pk, sk)$ The output C of Algorithm 9 comprises, with equal input as Algorithm 3 and the same choice for R, the ciphertext (U,v) from Algorithm 3. It also comprises a key K.

Algorithm 9: *PST.NR.CCA-KEM.Encapsulate* (*pk*)

Parameters Integers $p, t, q, n, \bar{m}, \bar{n}, \mu$

Input $pk = (\sigma, B) \in \Sigma \times Z_p^{n \times \bar{n}}$

Output $c = (U, v, d) \in Z_p^{n \times \bar{m}} \times Z_t^\mu \times \{0, 1\}^\gamma$ (line 1) $m \xleftarrow{\$} Z_{2B}^\mu$ (line 2) $(\hat{K}, \rho, d) = G(\sigma, B, m)$ $(U, v) = PST.CPA.PKE.Encryptwithro(pk, m, \rho)$ $c = (U, v, d)$ $K = H(\hat{K}, c)$ return $(c, K)$ With equal secret key S and equal input (U,v), the value of m' equals that as when given to Algorithm 3. We conclude that if the random choices in the NR CCA algorithms equal those of the NRCPA-PKE algorithms, and the NRCPA-PKE algorithms correctly retrieve the message m chosen in Line 1 of Algorithm 9, then m=m'. In that case, (K̂',ρ',d') as computed in line 2 of Algorithm 10 equals (K̂,ρ,d) in line 2 of Algorithm 9, and so the values of K as computed in line 5 of Algorithm 10 and Algorithm 9 are equal. If the condition in line 5 of Algorithm 10 is not satisfied, then the output is a random key.

---

Algorithm 10: PST.NR.CCA-KEM.Decapsulate( pk , sk , c )

---

Parameters Integers $p,t,q,n,\overline{m},\overline{n},\mu,\zeta$
Input pk = $(\sigma,B) \in \Sigma \times Z_p^{n \times \overline{n}}$, sk = $(S,z) \in (T_n(h))^{\overline{n}} \times \{0,1\}^\zeta$, c = $(U,v,d) \in Z_p^{n \times \overline{m}} \times Z_t^\mu \times \{0,1\}^\gamma$
Output $K \in \mathcal{K}$
(line 1) m' =PST .NR.CPA − PKE .Decrypt (S, (U, v))
(line 2) (K̂',ρ',d') = G(σ,B,m')
(line 3) (U',v') = PST.CPA-PKE.Encryptwithrho (pk , m' , ρ')
(line 4) if (U' , v' , d') = (U,v, d) then
(line 5) return K=H(K̂',c)
(line 6) else
(line 7) return K = H(z,c)
(line 8) end if

---

Remark In Algorithms 9 and 10, we implicitly map (σ, B) m' and c to binary strings before feeding then to G and H, respectively.

1.7 Non-Ring and Ring Case Combined

In this section, we describe a combined non-ring and ring version of the previous algorithm, with the polynomial ring $R_n=Z[x]/(x^n-1)$. We use * to denote multiplication in $R_n$. To stress the similarity with the non-ring case, we identify the polynomial $\Sigma_{i=0}^{n-1} f_i x^i$ and the (column) vector $(f_0, f_1, K, f_{n-1})^T$. For $f,g \in Z^n$, we define f*g as the coefficient vector of the polynomial $f(x)g(x) \pmod{(x^n-1)}$. That is, for $0 \leq i \leq n-1$, $$(f*g)_i = \sum_{j=0}^{n-1} f_j g_{(i-j)_n}.$$

We also define a multiplication * of matrices, as follows. Let $B \in Z^{n \times \overline{n}}$ and let $R \in Z^{n \times \overline{m}}$, say $B=[b_0,K,b_{\overline{n}-1}]$ and $R=[r_0,K,r_{\overline{m}-1}]$.

The $\overline{n} \times \overline{m}$ matrix $B^T*R$ is defined as $$B^T * R = \begin{bmatrix} b_0 * r_0 & b_0 * r_1 & \Lambda & b_0 * r_{\overline{m}-1} \\ M & M & M & M \\ b_{\overline{n}-1} * r_0 & b_{\overline{n}-1} * r_1 & \Lambda & b_{\overline{n}-1} * r_{\overline{m}-1} \end{bmatrix}$$

To discriminate between the ring and no-ring case, we use a Boolean parameter ring.

---

Algorithm 11: *PST.CPA- PKE.Keygeneration*( )

Parameters Integers $p, q, n, h, \overline{n}$;

Boolean ring Requirement If ring then $\mu \leq n\overline{n} \cdot \overline{m}$ else $\mu \leq \overline{n} \cdot \overline{m}$ Input Output- $pk \in \Sigma \times Z_p^{n \times \overline{n}}$, $sk \in (T_n(h))^{\overline{n}}$ $s \xleftarrow{\$} \{0, 1\}^{rs}$ $S = f_s(s)$ -continued $\sigma \xleftarrow{\$} \Sigma$ if ring then begin a = $f_{pol}(\sigma)$; $B = \langle a*S \rangle_q$ end -continued else begin $A = f(\sigma)$; $B = (\langle AS \rangle_q)$ end
$B = \text{Compress}_{p,q}(B)$
$pk = (\sigma, B)$
$sk = S$
return $(pk, sk)$

---

As discussed above, embodiments of this invention may be based on a difficulty parameter and a structure parameter to specify the type of cryptography to be used. In the present algorithm, input parameter n is used to denote the size of the output values pk and sk, and as such, the difficulty parameter may be used as the value of n. Similarly, the ring parameter of this algorithm is used to indicate whether the ring version of the algorithm is used with ring $R_n=Z[x]/(x^n-1)$ (and hence may be set to True if the structure parameter is equal to the difficulty parameter n), or the non-ring version of the algorithm is used (and hence may be set to False if the structure parameter is equal to 1).

In both the ring and the non-ring case, the algorithm uses a matrix a or A of dimension equal to the difficulty parameter divided by the structure parameter with entries being integer polynomials of degree less than the structure parameter, which may be a shared matrix. In particular, in the ring case, as mentioned above, the structure parameter may be equal to the difficulty parameter, in which case the matrix a may contain a single polynomial of degree n, corresponding (via the abovementioned identification of polynomials with vectors) to a vector of length n, as shown in Algorithm 11. In the non-ring case, the structure parameter may be equal to 1 such that the matrix A is of dimension equal to the difficulty parameter and contains polynomials of degree less than one, e.g., integers. In both cases, a or A is obtained by generating it from value σ using a function $f$, where σ may be a seed and evaluating $f$ may comprise evaluating a deterministic pseudo random number generator.

In Algorithm 11 the matrix S, which may be a private key matrix, is generated from the domain $T_n(h)^{\overline{n}}$, i.e., with entries being trinary n-by-$\overline{n}$ matrices, corresponding (via the abovementioned identification of polynomials with vectors) to a matrix containing integer polynomials of degree less than the structure parameter.

Next, the algorithm generates a matrix B, which may be a public key matrix, by computing a matrix product between a or A (which may be a shared matrix) and S (which may be a private key matrix). In such an embodiment, as discussed above, an optimized implementation of the public-key computation a*S or AS may be used. In the ring case, polynomial multiplication operations a*S can be expressed as the multiplication of a n×n matrix and a vector of length n entries with entries from Zq. In the non-ring case, AS is also matrix multiplication with A of dimension equal to the difficulty parameter. As a consequence, in some embodiments where the optimized implementation of the public-key operation is used, a common matrix multiplication part may be called for different values of the structure parameter and/or difficulty parameter. Irregardless of this, embodiments using Algorithm 11 may generate a B (which may be a public key matrix) by computing a matrix product between a or A (which may be shared matrix) and S (which may be a private key matrix) modulo the first modulus and modulo a reduction polynomial with degree equal to the structure parameter and adding noise to the entries in the matrix product, where adding noise in this embodiment comprises multiplying each unscaled entry with p, dividing by q, rounding to an integer (e.g., the nearest integer), and taking the rounded entry modulo p.

Finally, the algorithm returns the values (σ,B) and S, such that in the resulting public key encryption operation, the public key may comprise B and the value σ from which a or A can be obtained; and the private key may comprise S.

The next algorithm generates from a public key pk, a message m and a randomness variable ρ a cipher text C comprising a first ciphertext part and a second ciphertext part.

Algorithm 12: *PST.CPA-PKE.Encryptwithrho(pk, m, ρ)*

Parameters Integers $p, t, q, n, \bar{m}, \bar{n}, \mu$;

Boolean ring Requirement If ring then $\mu \le n\bar{n} \cdot \bar{m}$ else $\mu \le \bar{n} \cdot \bar{m}$ Input $pk = (\sigma, B) \in \Sigma \times Z_p^{n \times \bar{n}}, m \in Z_{2^B}^\mu, \rho \in \{0, 1\}^{r_R}$ Output $c = (U, v) \in Z_p^{n \times \bar{m}} \times Z_t^\mu$ $R = f_R(\rho)$ if ring then begin $a = f_{pol}(\sigma); U = \langle a * R \rangle_q$ end else begin $A = f(\sigma); U = \langle A^T R \rangle_q$ end $U = Compress_{q,p}(U)$ if ring then $V = Sample_{\mu,n\bar{n},\bar{m}}(\langle B^T * R \rangle_p)$ else $V = Sample_{\mu,\bar{n},\bar{m}}(\langle B^T R \rangle_p)$;

$v = Compress_{p,t}\left(\left\langle v + \left\lceil \frac{p}{2^B} \right\rceil \cdot m \right\rangle_p\right)$ $c = (U, v)$ return $c$ As shown, the algorithm first obtains a value a or A, which may be a shared matrix, by generating it from the output of a deterministic pseudo random number generator, using the value σ from pk as the seed. Hence, the public key of the public key encryption scheme may comprise the seed from which the shared matrix is be obtained. Also, it generates a value $R = f_R(\rho)$, which may be a private matrix. As in Algorithm 11, a or A is a square matrix of dimension equal to the difficulty parameter divided by the structure parameter with entries being polynomials of degree less than the structure parameter, and R is a matrix with entries being integer polynomials of degree less than the structure parameter. Also as in Algorithm 12, a matrix U is computed, which may be a first ciphertext part, by computing a matrix product between a or A and R modulo q and modulo the reduction polynomial of degree equal to the difficulty parameter; and by then adding noise comprise multiplying each unscaled entry with p, dividing by q, rounding to an integer (e.g., the nearest integer), and taking the rounded entry modulo p.

Next, the algorithm uses value B from pk, which may be a public key matrix. Hence, the public key of the public key encryption scheme may additionally comprise the public key matrix of the network node corresponding to pk. From this, a value $B^T*R$ (in the ring case) or $B^T R$ (in the non-ring case), which may be a raw key, is computed, i.e., the matrix product between B and R, where B and R are seen as polynomials of degree less than the structure parameter. As remarked, in some embodiments the same permutation idea as for the public-key matrix may be applied to this computation, so that a common multiplication party may be used for different values of the structure parameter and/or difficulty parameter.

Finally, the algorithm computes a value v, which may be a second ciphertext part, from the value $B^T*R$ or $B^T R$ and from the message m, which may be, e.g., a plaintext message, or, when used in a encapsulation mechanism such as PST.CPA-KEM or PST.NR.CCA-KEM, a shared key shared between two parties from which a key used in subsequent communication may be derived. The value v is returned with U from the algorithm so that the values together may be sent to the network node corresponding to the given pk.

The encryption algorithm below generates from a public key pk and a message m a ciphertext C. This algorithm directly calls Algorithm 12, such that embodiments using Algorithm 13 may similarly receive a difficult parameter and structure parameter, obtain a shared matrix, generate a private matrix, generate a first ciphertext part and compute a second ciphertext part as above, and in embodiments of a public key encryption operation based on Algorithm 13, the public key may thus comprise a public key matrix and data from which a shared matrix can be obtained, and the private key may comprise a private key matrix.

Algorithm 13: PST.CPA-PKE.*Encrypt(pk, m)*

Parameters Integers $p, t, q, n, \bar{m}, \bar{n}, \mu$, Boolean ring

Input $pk = (\sigma, B) \in \Sigma \times Z_p^{n \times \bar{n}}, m \in Z_{2^B}^\mu$ Output $c = (U, v) \in Z_p^{n \times \bar{m}} \times Z_t^\mu$ $\rho \xleftarrow{\$} \{0, 1\}^{r_R}$ $c = pST.CPA-PKE.Encryptwithrho(pk, m, \rho)$ return $c$ Algoriths such as PST.CPA-KEM.Encapsulate( ) may use PST.CPA-PKE.Encrypt or PST.CPA-PKE.Encryptwithrho in the context of a key exchange or key encapsulation mechanism. In this case, U may take on the role of a public key matrix of the party performing the encapsulation and R may take on the role of the corresponding private key matrix. Similarly, v may take on the role of reconciliation data in order for the encapsulating device and the decapsulating device to arrive at the same shared key.

The decryption algorithm retrieves, from a secret key sk and a ciphertext C, an (estimate for) the plaintext message m.

---

Algorithm 14: PST.CPA-PKE.Decrypt(sk,c)

---

Parameters Integers $p,t,q,n,\overline{m},\overline{n},\mu$; Boolean: ring Requirement If ring then $\mu \leq n \overline{n} \cdot \overline{m}$ else $\mu \leq \overline{n} \cdot \overline{m}$
Input sk = $S \in (T_n (h))^{\overline{n}}$, c = $(U, v) \in Z_p^{n \times \overline{m}} \times Z_t^\mu$
Output $\hat{m} \in Z_{2^B}$
$v$ = Decompress$_{p,t}(v)$
if ring
then X =Sample$_{\mu,\overline{m},\overline{m}}(\langle (S^T * U)\rangle_p)$
else X =Sample$_{\mu,\overline{n},\overline{m}}(\langle S^T U\rangle_p)$
$\hat{m}$ =Compress$_{p,2}^B(v - X)$
return $\hat{m}$

---

Similarly to the algorithms above, Algorithm 14 receives as input parameters a value n indicating the size of the input sk and a value ring indicating whether the ring or non-ring variant is to be used, e.g., in embodiments using Algorithm 14, n may correspond to the difficulty parameter and ring may indicate whether or not the difficulty parameter is equal to the structure parameter. The algorithm obtains as input a matrix S with entries, via the correspondence between vectors and polynomials of degree n discussed above, being integer polynomials of degree less than the structure parameter, where S may be a private key matrix of the node itself. The algorithm gets as further input a matrix U, which may be a first ciphertext part, and computes $S^T*U$ (in the ring case) or $S^TU$ (in the non-ring case), which may be a raw key and is computed as a matrix product between S and U with both matrices seen as matrices containing polynomials of degree at most the structure parameter. The algorithm then uses the matrix product, e.g., value $S^T*U$ or $S^TU$, and another value v received as input, which may be a second ciphertext part, to obtain message $\hat{m}$, by using the Sample and Compress procedures. As in PST.CPA-PKE.Encryptwithrho, message $\hat{m}$ may comprise a shared key in a key exchange mechanism from which a key for subsequent communication is derived in one of the ways detailed below.

As discussed above, PST.CPA-PKE.Decrypt may be used by algorithms such as PST.NR.CPA-KEM.Decapsulate in the context of key encapsulation or key exchange. In this case, U may be a public key matrix of the party performing encapsulation, e.g., encryption PST.CPA-PKE.Encrypt; and v may be reconciliation data in order for both nodes to arrive at the same value for $\hat{m}$, which may be a message, shared key, or data for which a shared key in subsequent communication is derived, e.g. as detailed for PST.NR.CPA-KEM-.Decapsulate.

1.7.1 Framework Configurations

The above algorithms allow us to enable several algorithms depending on configuration parameters.

LWR-based CPA-KEM For n=1 and k=d.
RLWR-based CPA-KEM For n=d and k=1.
LWR-based CCA-KEM For n=1 and k=d.
RLWR-based CCA-KEM For n=d and k=1.
LWR-based CCA-KEM-DEM For n=1 and k=d.
RLWR-based CCA-KEM-DEM For n=d and k=1.

FIG. 1 schematically shows an example of an embodiment of a key agreement network 100. Key agreement is an example of a cryptographic operation. The key agreement utilizes a number of elements, e.g., constructing a shared matrix, a private key matrix, a public key matrix, matrix multiplication, adding noise, etc., which are common to other types of cryptographic operations, e.g., public key encryption. In an embodiment, device 100 could be reconfigured for other types of cryptographic operations, e.g., as indicated above, or as indicated in the references. In an embodiment, device 100 could be reconfigured for multiple types of cryptographic operations. In any case, device 100 has the advantage that many different levels of structure and of difficulty are available. For example, the cryptographic operation may any one of: a key exchange (KEX) protocol, a key encapsulation mechanism (KEM), public-key encryption (PKE), a digital signature. In an embodiment, the first network node may be configured to receive a selector, selecting a cryptographic operation from multiple different cryptographic operations. As an example, though, the embodiments below assume device 100 is configured to key agreement.

Shown in FIG. 1 are two network nodes in the system: a network node 110 of initiator type and a network node 210 of responder type. In an embodiment of the key agreement system the number of nodes may be larger, even much larger, than two, e.g., more than a 1000 nodes, e.g. more than 10^6 nodes.

The difference between a network node of initiator or responder type is how it deals with reconciliation data. A network node of initiator type receives reconciliation data and applies it to obtain the shared key, whereas a network node of responder type generates reconciliation data and sends it the network node of initiator type. The responder type network node does not need reconciliation data to obtain the shared key. Typically, an initiator type will also initiate the key agreement protocol between the two network nodes, as this may reduce the number of rounds executed between the two networks node. However, it is not necessary; the key agreement protocol could also be initiated by a network node of responder type.

Furthermore, in an embodiment of the network node, the network node is configured to operate according to an initiator mode and according to a responder mode. For example, if the network node initiates a key agreement, e.g., sends a message to another network node signaling the start of the key agreement protocol, then the network node may switch to initiator mode. If the network node responds to a key agreement, e.g., receives a message from another network node signaling the start of the key agreement protocol, then the network node may switch to responder mode. Although this is convenient in practice, also this option is not strictly necessary; for example, in a key agreement system some modes may only be configured as initiator and some may only be configured as responder nodes. A consequence of this will be that some nodes cannot agree on a shared key together. For some networks this need not be a problem, e.g., in ad-hoc network, or ad-hoc wireless grids, etc., so long as sufficiently many pairs of network nodes can communicate and agree on a shared key.

Initiator node 110 comprises a communication interface 120. Responder node 210 comprises a communication interface 220. The communication interfaces may be arranged for digital communication with the other nodes in the key agreement system. It is not necessary though that all nodes in the system can be reached at all times.

Communication interface 120 and 220 are arranged for digital communication. For example, the communication interfaces may be arranged to communicate over a computer network. For example, the communication interface may be arranged for wireless, e.g., Wi-Fi, ZigBee, Bluetooth and the like, and/or wired communication, e.g., Ethernet, USB, and the like. The communication between nodes 110 and 210 may also be a combination of wired and wireless connections. For example, the nodes in system 100, including nodes 110 and 120 may comprise an electronic storage that contains a communication identifier, which uniquely identifies the node within system 100. For example, the communication identifier may be included in digital messages exchanged between nodes 110 and 210, e.g., to address the message. For example, the communication identifier may an IP address, a MAC address, and the like.

The electronic network node is configured for a key exchange (KEX) protocol. The protocol involves exchanging messages between the nodes 110 and 210 over the communication interfaces 120 and 220, and performing computations on, e.g., data received from the other node. The execution of the key agreement protocol is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may also be wholly or partially be implemented in computer instructions that are stored at the network nodes and are executable by a microprocessor of the network node.

Initiator node 110 and responder node 210 are configured for a key exchange (KEX) protocol. KEX schemes involve the exchange of public-data, often termed public keys, by each party, that is then independently used by the other party along with their private data, often termed a secret-key, to calculate the common shared secret. An interesting feature of some embodiments is that the actual final, shared secret is never exchanged between the parties, not even in encrypted form, but is calculated independently by the two parties at each end. This results in a desirable feature known as forward-secrecy, which ensures that even the compromise of a party's long-term secret-keys by an attacker in the future would not compromise the secrecy of encrypted message exchanged in the past.

Embodiments of the inventions do not rely on a trusted third party to provide confidential communication. The communication channel between communication interfaces 120 and 220 need not necessarily be a secure channel. Attackers may be able to eavesdrop on the communication channel. Even so, the key that is agreed between nodes 110 and 210 may be secure. If the communication channel is protected against alterations, a degree of authentication may be obtained in so far as provided by the channel. However, if the channel between communication interfaces 120 and 220 is not protected against alterations, no KEX scheme will achieve authentication. To obtain authentication, embodiments may be combined with any known authentication mechanism, e.g., an implicit authentication mechanism, e.g., using certified public-keys, or an explicit authentication mechanism, e.g., using digital signatures.

Initiator node 110 comprises a shared matrix unit 130. Responder node 210 comprises a shared matrix unit 230. The shared matrix units 130 and 230 are configured to obtain a shared matrix (A) that is shared between the two nodes. There many ways to ensure that the same matrix is shared between nodes 110 and 210, especially given the fact that the matrix A does not necessarily have to be kept private to the nodes 110 and 210.

Shared matrix unit 130 and shared matrix unit 230 are configured to receive as input a difficulty parameter d, and a structure parameter n. In FIG. 1, the difficulty parameter d, and structure parameter n, are schematically indicated by reference number 131. Note that both units receive the same difficulty parameter d, and structure parameter n. These numbers d and n determine the size and the type of elements of matrix A. Devices 110 and 210 may also be configured to receive a selector, selecting a cryptographic operation.

For example, the difficulty parameter d, and structure parameter n may be set through an API, e.g., by an application that uses device 110 and 210, e.g., for protected communication. The application can decide on the required difficulty and structure, and instruct device 110, and/or 250 by, e.g., a function call.

Entries in the shared matrix A are preferably selected modulo a first modulus q, modulo a reduction polynomial ($f$) of degree equal to the structure parameter (n). If n=1, the entries are integers; if n>1, they are polynomials. The first modulus q and reduction polynomial $f$ is also shared between nodes 110 and node 210, e.g., communicated or predetermined. Shared matrix A is a square matrix k×k, e.g., of dimension k. The number of rows and columns k is equal to the difficulty parameter d divided by the structure parameter n. If n=d, the matrix A has a single polynomial entry. A practical choice for the reduction polynomial $f$ is, e.g., $x^n+1$, $x^n-1$, or $$\frac{x^n - 1}{x - 1} = x^{n-1} + x^{n-2} + \ldots + 1.$$

It is preferred that the structure parameter n divides the difficulty parameter d, so that the dimension k can be computed. However, in an embodiment, k is obtained by rounding the difficulty parameter d divided by the structure parameter n, e.g., rounding to the nearest integer, rounding up, or rounding down.

In an embodiment, the devices 110 and 210 are configured to receive different difficulty parameters d, and/or different structure parameters n. For example, the devices may allow any difficulty parameters d, e.g., up to some upper bound, and/or above some lower bound. Moreover, the devices may allow n=1 or n=d, or more generally, any n that divides d and for which 1≤n≤d.

Interestingly, even though different parameters are received, the nodes do not need to have different implementations for the different parameter values. For example, nodes 110 and 210 may be configured to call a common matrix multiplication part for different values of the structure parameter n and/or difficulty parameter d.

In an embodiment, the structure parameter n is restricted such that n or n+1 is a prime number, but this is not necessary. In an embodiment, the structure parameter n is a power of 2, and the first modulus q is a prime number, but this is not necessary either.

For example, one of the nodes, say the initiator node 110, e.g., in shared matrix unit 130, may select a matrix A, e.g., at random with elements modulo q and modulo $f$. The entries may then be sent through the communication units to the other node, e.g., to shared matrix unit 230. In this case, the latter shared matrix unit 230 will simply receive the matrix and store it. Matrix A may also be chosen by responder node 210 instead and sent to the initiator node 110.

The two nodes may also cooperate in choosing the matrix A. For example, each node may select some of the entries, and sent it to the other side. For example, the initiator nodes may select the odd entries, and the responder node the even entries, etc. In this way, none of the two nodes has control over the final matrix A. For example, the two nodes could each select a full matrix A and communicate it to the other side. After this, the two matrices may be added modulo q and $f$. To avoid giving the last node to send the matrix an advantage, a commitment on the chosen matrix may first be send by said last node.

An interesting way to reduce the overhead of sending the full matrix A is to generate a random seed and sending the random seed through the communication channel to the other node. After receiving the seed, the first and second network node may use it to generate the matrix A in any of the above ways. The same random seed is used to seed a deterministic pseudo random number generator which in turn generates the matrix (A) from the output of the pseudo random number generator. As above, each node can send a seed, e.g., to generate different parts of A, or the two seeds may be combined, e.g., added, or XOR-ed etc., and the combined seed may be used to generate A.

The seeds may, e.g., be selected from a further random number generator, e.g., a true random number generator. The nodes may also be configured with a list of random numbers, e.g., at manufacture. In this case, the nodes select a next random number from the list each time a new matrix A is generated for a new key agreement. If the list of random number is exhausted, it may be replenished from a trusted source.

In an embodiment, the elements of A as selected from a vector a_master. In an embodiment, the matrix A is changed after each use, e.g., permuted, one or more entries may be replaced.

Initiator node 110 comprises a private key matrix unit 140. Responder node 210 comprises a private key matrix unit 240. Private key matrix unit 140 is configured to generate a private key matrix $S_I$; Private key matrix unit 240 is configured to generate a private key matrix $S_R$. The entries in the private key matrices are integer polynomials of degree at most n. If the degree of $f$ is 1, then practically speaking the entries are integers.

Generally speaking, the private key matrix is chosen randomly. For example, the entries in the private key matrix $(S_I, S_R)$ may be chosen from a uniform random probability distribution. The distribution may also be non-uniform, e.g., wherein the probability of a zero entry is larger than the probability of a non-zero entry, e.g., at least twice as large.

Various restriction may be imposed on the private key matrix, e.g., to improve security or to reduce its data size. The private key matrix $(S_I, S_R)$ may be chosen uniformly random from candidate private key matrices, e.g., within the restrictions. For example, in an embodiment, the coefficients of elements in the private key matrix are bounded in absolute value by a bound (s), e.g., wherein said bound is 2 (s=2), or wherein the bound is 1 (s=1), the latter corresponding to signed binary. For example, the columns and/or rows of the private key matrix $(S_I, S_R)$ have a fixed or bounded hamming weight $(h_s)$.

The inventors found that, surprisingly, choosing the bound small has a dual advantage: matrix multiplications with the private key matrix are faster, and the distance between the raw keys computed at each side is smaller (see below). The latter means that less reconciliation data is needed and/or the chance of a failure in the protocol because the nodes agreed on a different key is smaller.

In an embodiment, the bound s is 1 (s=1). That is, the entries of a private key matrix only have coefficients that are the values −1, 0 and 1. We will refer to this also as 'signed binary'.

The dimensions of the private key matrices are chosen so that they can be multiplied with matrix A. For example, if A is k by k, then the private key matrix of the initiator node may be an k by $\bar{k}$ matrix. The size of $\bar{k}$ and k are chosen large enough to obtain a sufficient number of bits in the shared key, and to obtain a sufficiently high security level.

In addition to restricting the size of the entries of the private key matrix further advantages are obtained by restricting the number of non-zero elements. We will refer to the hamming weight of a column or row of a matrix as the sum of the Hamming weight of its components. Here, the Hamming weight of a polynomial is defined as the number of nonzero coefficients of the polynomial.

The inventors investigated different ways to restrict the hamming weight of private key matrices. It is generally sufficient to restrict hamming weight for either the columns or for the rows, depending on whether the private key matrix is left or right multiplied with matrix A. For example, if the private key matrix is right-multiplied with the matrix A (e.g., AS) it is sufficient to restrict hamming weight in columns of the private key matrix.

For example, an upper bound may be selected for the hamming weight of the columns and/or rows of a private key matrix. The upper bound may the same for all columns and/or rows. In an embodiment, the columns and/or rows of the private key matrix $(S_I, S_R)$ have the same fixed hamming weight.

Security is improved if-subject to the conditions-a private key matrix is chosen uniformly random from the candidate private key matrices, that is from the matrices that satisfy the chosen requirements, e.g., as to the bounds on entries and the hamming weights in columns or rows. For example, if one desires to enforce the condition that the hamming weight of each column is 50, then it is advantageous to select a private key matrix from the set of all matrices with the correct dimensions that have hamming weight of 50 for each column. Efficient algorithms to select a uniformly random bit string of any desired hamming weight are known.

A different way to restrict the hamming weight of the private key matrices is to choose the columns and/or rows of a private key matrix $(S_I, S_R)$ from a probability distribution. For example, entries in the private key matrix $(S_I, S_R)$ may be chosen from a non-uniform probability distribution, wherein the probability of a zero entry is larger than the probability of a non-zero entry. In an embodiment, the probability distribution is chosen so that it gives a predetermined expected hamming weight for the columns and/or rows. For example, to choose a column of length n and expected hamming weight $h_s$ one may select each entry as non-zero with probability $h_s/n$. The non-zero entry may be chosen as 1 or −1, e.g., with equal probability.

Initiator node 110 comprises a public key matrix unit 150. Responder node 210 comprises a public key matrix unit 250. The public key matrix unit computes a public key matrix from matrix A and a private key matrix s.

The terms public and private are intended to convey that the shared key cannot be obtained only with knowledge of public information, or not without knowledge of some private information. There is no requirement though that public information is actively shared. For example, the key agreement protocol could be executed over a (presumed) secure channel, which keeps the public keys secure from eavesdroppers. In this case the key agreement protocol provides an additional layer of security in case the security of the channel is breached.

The public key matrix unit computes a public key matrix P ($P_I$, $P_R$ for the initiator and the responder respectively) by computing a matrix product between the shared matrix (A) and the private key matrix ($S_I$, or $S_R$ respectively) modulo the first modulus (q) and $f$, obtaining a matrix product and adding noise.

Note, this intermediate matrix multiplication is not revealed. Knowledge of the shared matrix A and the result of this matrix multiplication would reveal the private key, as it may be computed by inverting the matrix A.

Adding noise may be done by selecting error terms, or noise terms and adding them to the entry of the above matrix product. For example, the noise may be selected from a Gaussian distribution with mean 0. A preferred way to add noise is scaling the intermediate matrix product down, e.g., scale the coefficients down.

In an embodiment, the public key matrix unit scales the entries in the matrix product down to a second modulus p. The second modulus p is smaller than the first modulus q. A scaled entry is equal to the unscaled entry multiplied with the second modulus (p), divided by the first modulus (q) and rounded to the nearest integer. For example, if x is an unscaled entry modulo q in the matrix product, the scaled entry may be selected as $$\lfloor \frac{p}{q} x \rceil,$$

wherein $\lfloor \rceil$ represents the nearest integer. After the scaling operation, it is no longer straightforwardly possible to compute the private key from the public key and the matrix A.

Entries in a public key matrix may be represented as polynomials with coefficients in the interval [0, p−1]. Entries in a private key matrix may also be represented as polynomials with coefficients in the interval [0, p−1]. There is an advantage to choose the coefficients in the interval $$[-\frac{p}{2}, \frac{p}{2}]$$

to reduce the size of the integers for subsequent multiplications. As pointed out above the private key matrix may also have coefficients chosen in the interval [−s, s] or even [0, s].

The multiplication of matrix A and a private key matrix s is done modulo the first modulus q and $f$. For this end the network node may comprises a modular reduction unit for reducing modulo q and modulo $f$. If the coefficients in the private key matrix s are small, e.g., bounded by 1, or bound by 1 in absolute value, the modular reduction may be simplified; during the matrix multiplication, each time a coefficient becomes larger than q or smaller than 0 the result is brought back to the interval 0 to q−1 by subtracting or adding q.

Both the initiator node and the responder node send their public key matrix to the other node, e.g., using the communication interfaces 120 and 220. The inventors found at least three advantages that are realized by scaling down the matrix product. First of all, generation and explicit addition of noise into the matrix product is avoided. Introducing noise requires the computation of a probability distribution, e.g., a Gaussian distribution. These are relatively computationally intensive. Second, communication requirements are reduced. Since second modulus p is smaller than the first modulus q, fewer bits are needed to represent an entry of the public key matrix than of a private key matrix. Third, computations that involve the public key matrix are smaller since they involve smaller numbers. It is surprising that a single measure simultaneously provides three advantages.

It is strongly preferred that the second modulus p divides the first modulus q. Interestingly, the inventors found that neither the first nor the second modulus needs to be a prime number. In fact, it was found that choosing the second modulus (p) and/or the first modulus (q) as a power of 2 has the advantage that the public and private keys are uniformly distributed. In an embodiment both the first and second modulus is a power of 2.

In an embodiment, we further require that $2^{B+b_h}|p$ in addition to moduli p and q that are powers of two. This causes uniform shared keys even if the reconciliation data is observed. B is the number of shared key bits extracted per entry of raw key.

The sizes of the moduli need not be very large. For example, in an embodiment the second modulus has as bit size of 12 or more, and/or the first modulus has as bit size of 8 or more. Larger or smaller sizes are possible depending on the security requirements. In an embodiment, q is in the range of $2^{12}$ and $2^{15}$, p is in the range $2^7$ and $2^9$ (inclusive). The values of p and q may be chosen larger or smaller as security demands dictate.

Initiator node 110 comprises a shared key unit 160. Responder node 210 comprises a shared key unit 260. The shared key units are different in the sense that they either generate and transmit, or receive and apply the reconciliation data.

Both shared key unit 160 and shared key unit 260 are configured to compute a raw key 162, 262 as a matrix product between the received public key matrix of the other node and the private key matrix of the network node itself. The product is computed modulo the reduction polynomial $f$. If scaling is used, the latter is computer also modulo the second modulus (p). The dimensions of the matrices, and matrix multiplications are chosen such that if the scaling operation were omitted both parties would compute an identical raw key. That is, identical keys would result without adding noise, and all computations were done modulo q and $f$. However, due to the noise both raw keys need not be identical. Computing the raw key may be done modulo p. The network nodes may comprise a modular unit for reducing the result of the multiplications modulo p.

Shared key unit 260 of responder node 210 is arranged to obtain the shared key 266 and to obtain reconciliation data 264 from the raw key 262, and to send the reconciliation data 264 to the initiator network node 110. In FIG. 1, the shared key is obtained from the raw key and reconciliation data, but this is not necessary, e.g., it is also possible that the reconciliation data is obtained from the raw key and the shared key, e.g., if the responder performs key exchange by means of key encapsulation e.g., PST.CPA-KEM.Encapsulate or PST.NR.CCA-KEM.Encapsulate. Reconciliation data may take the form of one or more bits in the raw key, e.g., bits from coefficients. Bits chosen as reconciliation data are ignored for the purpose of generating a key. The references contain various examples of reconciliation data.

Shared key unit 260 chooses some bits from the entries of the raw key to form a key from. For example, the chosen bits may be concatenated. In an embodiment, the chosen bits are input to a key derivation function (KDF), e.g., a cryptographic hash function. An example of a KDF is given in e.g., the CMLA_KDF from CMLA Technical Specification, Version: V1.43-20131218, or the KDF function defined in "DRM specification", OMA-TS-DRM-DRM-V2_0_2-20080723-A, Open Mobile Alliance™, Version 2.0.2, section 7.1.2, etc. The key derivation function may be applied to the entries of key bits in the raw key, e.g. obtained by the rounding function, e.g., after concatenation, or from the outputs from the reconciliation function, e.g., also after concatenation.

Some bits that are not chosen as key bits may be selected as reconciliation data. Finally, some bits may be discarded altogether. The key reconciliation data obtained from the raw key by shared key unit 260 is sent to the initiator node 110.

Shared key unit 160 is configured to receive the reconciliation data 164 ($h$) of the second network node, and to compute a shared key 166 by applying a reconciliation function to the received reconciliation data and the raw key matrix 162. For example, the reconciliation function may be applied to each of the entries in the raw key 162 and corresponding part of reconciliation data. For example, if the reconciliation data 164 was part of the raw key generated by responder unit 210, the initiator node may select a raw key that could have been obtained by node 210 and is compatible with the received reconciliation data, e.g. has the same middle bits as received.

One could reuse one of the matrix A and the private key matrix for multiple executions of the key agreement protocol (if both are the same one would obtain the same shared key). This would reduce communication overhead, especially if matrix A is reused. However, the inventors realized that there is no need to reuse any of matrix A and private key matrix since no authentication is connected to these elements. In a preferred embodiment, a fresh matrix A and a fresh private key is obtained for each new key exchange. This has the advantage that attackers do not have the option to observer additional information by observing multiple executions of the protocol. Moreover, forward secrecy is improved.

After the protocol is completed and both nodes have computed a shared key, one of the nodes may send a key confirmation message to the other node to verify that they have agreed on the same key. For example, a key confirmation message may be a hash of the shared key, an encryption of a fixed value, an encryption of a random value together with the random value. Key confirmation may also be performed using a challenge response protocol. One may also choose to omit key confirmation. If the parties obtain a different shared key, then subsequent communication performed between them will fail. For example, the shared key may be used to encrypt and/or authenticate further communications, e.g., digital messages. If they arrived at a different shared key, then decryption and/or verification may fail.

In the various embodiments, the communication interface may be selected from various alternatives. For example, communication interface may be a network interface to a local or wide area network, e.g., the Internet, a storage interface to an internal or external data storage, a keyboard, etc.

The network nodes may comprise an electronic storage, e.g., to store intermediate data such the matrix A, the public and private key matrices, and the shared key, etc. The storage may be implemented as an electronic memory, say a flash memory, or magnetic memory, say hard disk or the like. The storage may comprise multiple discrete memories together making up storage. The storage may also be a temporary memory, say a RAM. In the case of a temporary storage, the storage may use some means to obtain common parameters before use e.g. by obtaining them over an optional network connection (not separately shown).

Typically, the devices 110 and 210 each comprise a microprocessor (not separately shown in FIG. 1) which executes appropriate software stored at the devices 110 and 210; for example, that software may have been downloaded and/or stored in a corresponding memory, e.g., a volatile memory such as RAM or a non-volatile memory such as Flash (not separately shown). Alternatively, the devices 110 and 210 may, in whole or in part, be implemented in programmable logic, e.g., as field-programmable gate array (FPGA). Devices 110 and 210 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, a network node comprises a communication interface circuit, a shared matrix circuit, a private key matrix circuit, a public key matrix circuit, and a shared key circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 2:
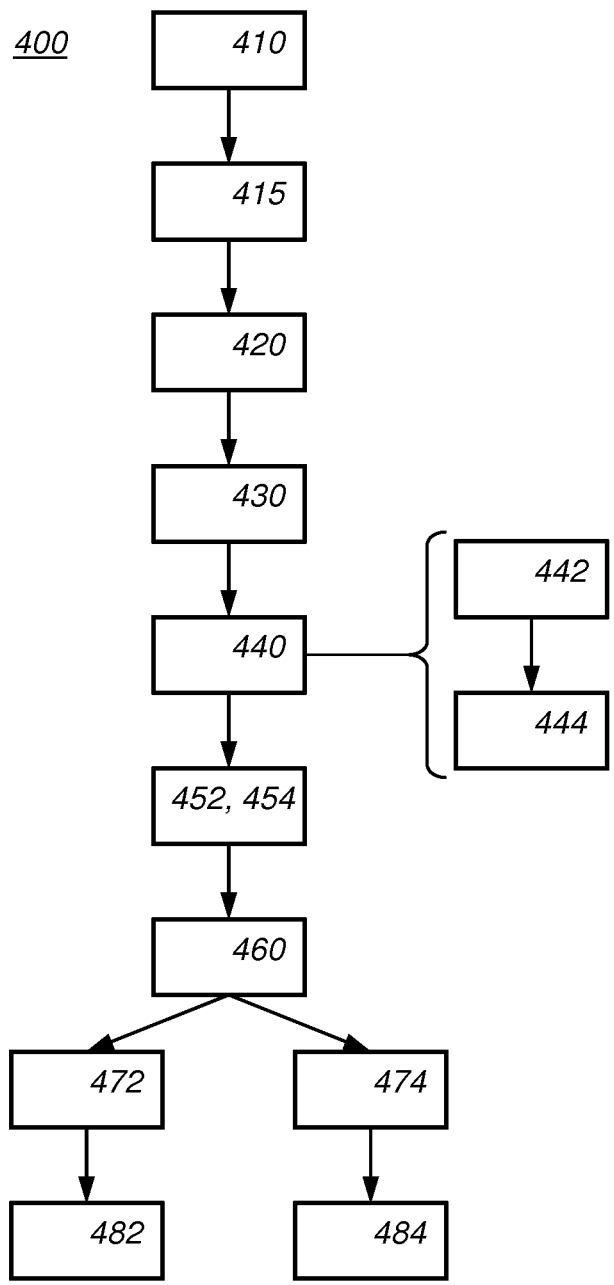

FIG. 2 schematically shows an example of an embodiment of an electronic key exchange method 400. The method may be executed by a first electronic network node, such as initiator node 110 or responder node 210.

Method 400 comprises arranging (410) digital communication between the first network node and a second network node, receive (415) as input a difficulty parameter (d), and a structure parameter (n), obtaining (420) a shared matrix (A), the shared matrix being shared with the second network node through the communication interface, the shared matrix (A) being a square matrix (k×k) of dimension (k) equal to the difficulty parameter (d) divided by the structure parameter (n), the entries in the shared matrix (A) being integer polynomials of degree less than the structure parameter (n), coefficients of the polynomials preferably being selected modulo a first modulus (q), generating (430) a private key matrix ($S_I$), entries in the private key matrix being integer polynomials of degree less than the structure parameter (n), generating (440) a public key matrix ($P_I$) by computing (442) a matrix product between the shared matrix (A) and the private key matrix ($S_I$) modulo the first modulus (q) and modulo a reduction polynomial (f) with degree equal to the structure parameter (n), obtaining a matrix product, and adding noise (444) to the entries in the matrix product sending (452) the public key matrix of the first network node to the second network node, receiving (454) a public key matrix ($P_R$) of the second network node, computing (460) a raw key as a matrix product between the received public key matrix of the second node and the private key matrix of the first network node.

If the first network node is operating, e.g., according to an initiator mode in a key exchange protocol, then the first network node performs the following further elements.

receiving (472) reconciliation data (h) of the second network node, computing (482) a shared key or message by applying a reconciliation function (rec) to the received reconciliation data and the raw key.

If the first network node is operating, e.g., according to a responder mode in a key exchange protocol, then the first network node performs the following further elements.

obtaining (474) a shared key and obtaining reconciliation data from the raw key, sending (484) the reconciliation data to the first network node.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 3A:
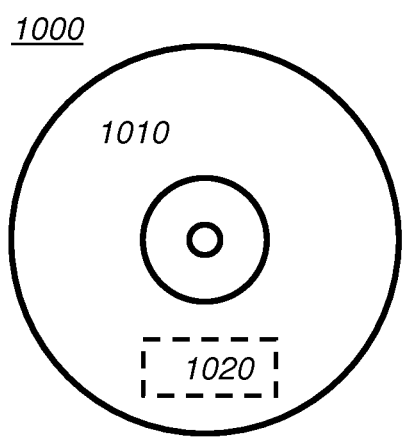

FIG. 3a shows a computer readable medium 1000 having a writable part 1010 comprising a computer program 1020, the computer program 1020 comprising instructions for causing a processor system to perform a key agreement method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said key agreement method 400, or another cryptographic operation(s) according to an embodiment.

Figure 3B:
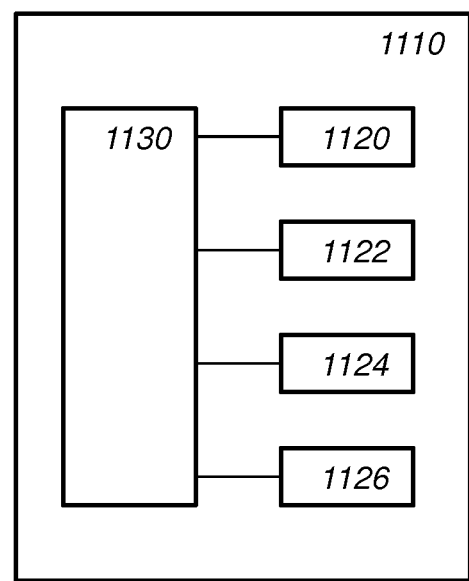

FIG. 3b shows in a schematic representation of a processor system 1140 according to an embodiment, e.g., to implement one or more cryptographic operations. The processor system comprises one or more integrated circuits 1110. The architecture of the one or more integrated circuits 1110 is schematically shown in FIG. 3b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, a network node may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

Figure 4A:
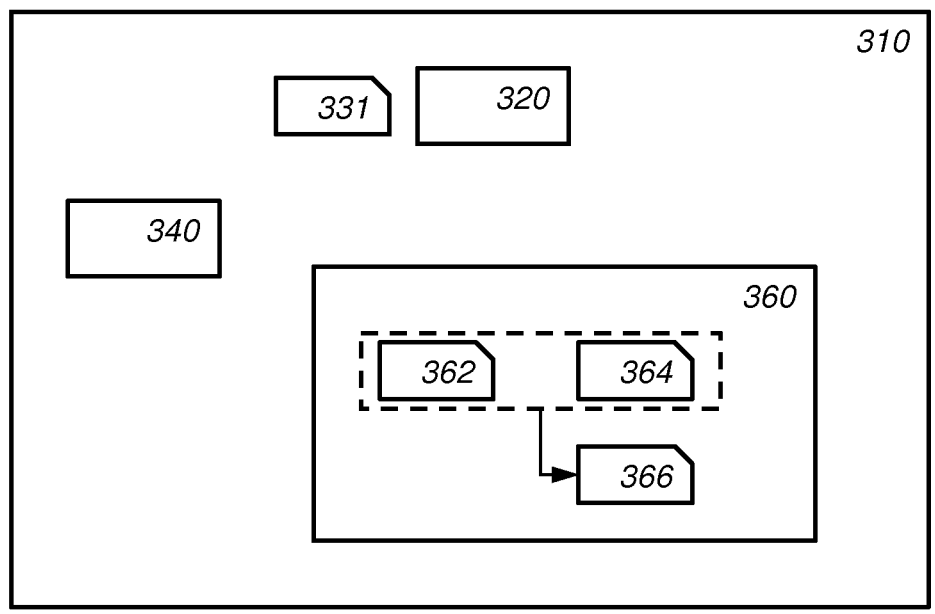

FIG. 4a schematically shows an example of an embodiment of a public key decryption node 310. This figure comprises a difficulty parameter and a structure parameter 331, a communication interface 320, a private key unit 340, a message computing unit 360, a raw key 362, a second ciphertext part 364, and a message 366. These units may operate according to algorithm PST.NR.CPA-PKE.Decrypt ( ) above, e.g., private key unit 340 may obtain S and message computing unit 360 may compute m̂. Note that this figure is analogous to the network node of initiator type 110 shown in FIG. 1, except that only the components are shown that correspond to the public key decryption operation. In particular, as shown in the algorithms PST.CPA-KEM and PST.NR.CCA-KEM, the network node 110 may perform key exchange making use of public-key key generation algorithms, e.g., PST.NR.CPA-PKE.Keygeneration( ) and public key decryption, e.g., PST.NR.CPA-PKE.Decrypt( ) algorithms. In FIG. 1, this decryption involves a difficulty parameter and a structure parameter 131, a communication interface 120, a private key unit 140, a shared key unit 160, a raw key 162, reconciliation data 164, and a shared key 166. FIG. 4a shows a public key network node that performs decryption without necessarily also performing key generation, hence it only has those elements from FIG. 1 that relate to decryption. That is, element 331 may correspond to element 131; element 320 may correspond to element 120; element 340 may correspond to element 140; element 360 may correspond to element 160; element 362 may correspond to element 162; element 364 may correspond to element 164 and element 366 may correspond to element 166. Note that the public key decryption node 310 obtains a message 366 as the result of decryption, while network node 110 obtains a shared key 166; however, the operations to obtain these respective results may in fact be the same in both cases.

Figure 4B:
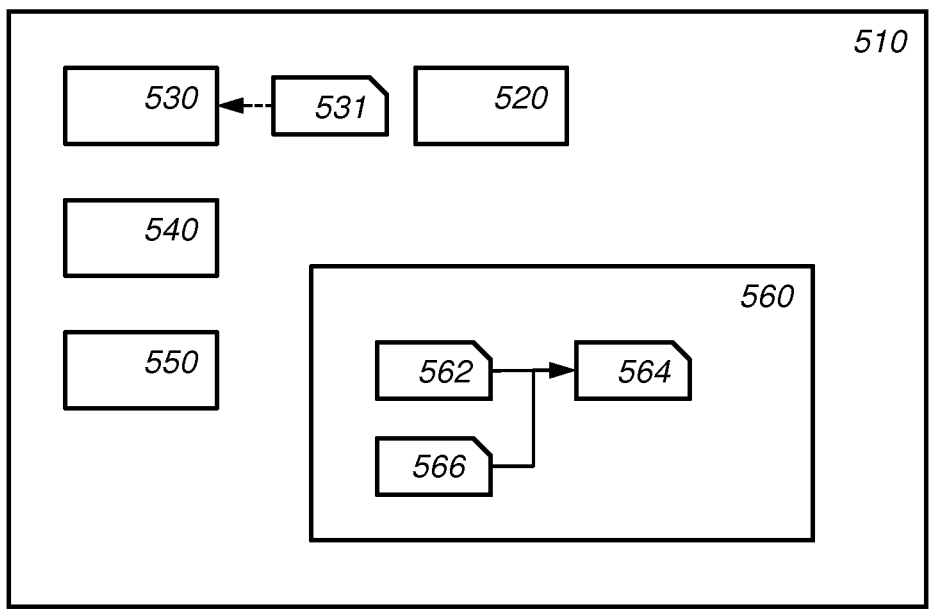

FIG. 4b schematically shows an example of an embodiment of a public key encryption node 510. This figure comprises a difficulty parameter and a structure parameter 531; a shared matrix unit 530; a communication interface 520; a private matrix unit 540; a first ciphertext part unit 550; a second ciphertext part unit 560; a raw key 562; a message 566; and a second ciphertext part 564. Encryption node 510 receives as input a difficulty parameter and a structure parameter 531; obtains a shared matrix 530; generates with the private matrix unit 540 a private matrix; generates with the first ciphertext part unit 550 a first ciphertext part; and generates with the second ciphertext part unit 560 a second ciphertext part 564, the latter being compured from a raw key 562 and a message 566. For instance, these units may operate according to one of the algorithms PST.NR.CPA-PKE.Encryptwithrho, PST.NR.CPA-PKE.Encrypt, PST. CPA-PKE.Encryptwithrho, or PST.CPA-PKE.Encrypt, as detailed above. For example, shared matrix unit 530 may obtain A, private matrix unit 540 may generate R, first ciphertext part unit 550 may generate U, and second ciphertext part unit 560 may compute v. This figure is analogous to the network node of responder type 210 shown in FIG. 1; in particular, as shown in PST.CPA-KEM and PST.NR.CCA-KEM, the responder node in key exchange or key encapsulation may in fact perform a public-key encryption such as performed by public key encryption node 510.

The following clauses are not the claims, but include contemplated embodiments. The Applicant hereby gives notice that new claims may be formulated to such clauses and/or combinations of such clauses and/or features taken from the description or claims, during prosecution of the present application or of any further application derived therefrom.

1. A first electronic network node (110) configured for a cryptographic operation, the first network node comprising
a communication interface (120) arranged for digital communication with a second network node,
a processor circuit configured to
receive as input a difficulty parameter (d), and a structure parameter (n),
obtain a shared matrix (A), the shared matrix being shared with the second network node through the communication interface, q the shared matrix (A) is a square matrix (k×k) of dimension (k) equal to the difficulty parameter (d) divided by the structure parameter (n), the entries in the shared matrix (A) being integer polynomials of degree less than the structure parameter (n), coefficients of the polynomials preferably being selected modulo a first modulus (q),
generate a private key matrix ($S_I$), entries in the private key matrix being integer polynomials, of degree less than the structure parameter (n),
generate a public key matrix ($P_I$) by
computing a matrix product between the shared matrix (A) and the private key matrix ($S_I$) modulo the first modulus (q) and modulo a reduction polynomial (f) with degree equal to the structure parameter (n), obtaining a matrix product, and adding noise to the entries in the matrix product, and
send the public key matrix of the first network node to the second network node.

2. A first electronic network node (110) as in Clause 1, wherein the cryptographic operation is a key exchange (KEX) protocol, the processor circuit being configured to
receive a public key matrix ($P_R$) of the second network node,
computing a raw key as a matrix product between the received public key of the second node and the private key matrix of the first network node,
wherein the first network node is further configured to
receive reconciliation data (h) of the second network node,
computing a shared key by applying a reconciliation function (rec) to the received reconciliation data and the raw key, or
wherein the first network node is further configured to
obtain the shared key and reconciliation data from the raw key,
send the reconciliation data to the second network node.

3. A first network node as in any one of the preceding clauses, wherein the cryptographic operation is any one of: a key exchange (KEX) protocol, a key encapsulation method (KEM), public-key encryption (PKE), a digital signature.

4. A first network node as in any one of the preceding clauses, wherein the reduction polynomial is $x^n+1$, or $x^n-1$, or $$\frac{x^n-1}{x-1}.$$

5. A first network node as in any one of the preceding clauses, wherein
the structure parameter (n) divides the difficulty parameter (d).
the dimension of the shared matrix (k) is obtained by rounding the difficulty parameter (d) divided by the structure parameter (n), e.g., rounding to the nearest integer, rounding up, or rounding down.

6. A first network node as in any one of the preceding clauses wherein
the structure parameter (n) is an integer which is at least 1, and at most the difficulty parameter (d; 1≤n≤d), and/or
the structure parameter (n) is restricted to be a prime number, and/or
the structure parameter (n) is a power of 2, and the first modulus is a prime number, and/or
the structure parameter (n) is restricted to be a prime number and the first modulus is a prime number, and/or
the structure parameter (n) is restricted to be a prime number, and the first modulus is a power of two, and/or the structure parameter (n) is restricted to be a prime number, and the first modulus is a power of two and the reduction polynomial is an irreducible module 2.

7. A first network node as in any one of the preceding clauses, wherein the processor circuit is configured to compute an expanded shared matrix for shared matrix (A), by replacing polynomial entries of degree larger than 0, with a circulant matrix, said expanded shared matrix having a number of columns and row equal to the difficulty parameter.

8. A first network node as in Clause 7, wherein the processor circuit is configured to compute an expanded shared matrix for shared matrix (A) containing d×d entries, each entry being an integer and the same processor circuit being used for the evaluation of this shared matrix (A) and for obtaining the public-key with the structure parameter (n) being one (1) or equal to the difficulty parameter (d), 9. A first network node as in any one of the preceding clauses, wherein the cryptographic operation is public key encryption, and wherein the shared matrix and the public key matrix are the public key, and wherein the private key matrix is the private key.

10. A first network node as in any one of the preceding clauses, wherein adding noise to the matrix product comprises
    scaling the entries in the matrix product down to a second modulus (p), a scaled entry being equal to the unscaled entry multiplied with the second modulus (p), divided by the first modulus (q) and rounded to the nearest integer, the second modulus (p) being smaller than the first modulus (q), the bound (s) being at most the second modulus (p), wherein computing a raw key as a matrix product between the received public key of the second node and the private key matrix of the first network node is done modulo the second modulus (p), or
    selecting noise elements for one or more or all elements in the matrix product from a noise distribution and adding the noise elements to the one or more or all elements in the matrix product, e.g., wherein the noise elements have coefficients selected from a Gaussian distribution with mean 0.

11. A first network node as in any one of the preceding clauses, wherein
    the private key matrix ($S_I, S_R$) is chosen uniformly random from candidate private key matrices, and/or
    coefficients of elements in the private key matrix are bounded in absolute value by a bound (s), e.g., wherein said bound is 2 (s=2), or wherein the bound is 1 (s=1), the latter corresponding to signed binary, and/or
    columns and/or rows of the private key matrix ($S_I, S_R$) have a fixed or bounded hamming weight (h).

12. A first network node as in any one of the preceding clauses, wherein entries in the private key matrix ($S_I, S_R$) are chosen from a non-uniform probability distribution, wherein the probability of a zero entry is larger than the probability of a non-zero entry.

13. A first network node as in any one of the preceding clauses, arranged to obtain a different matrix (A) and/or a different private key for each new key exchange.

14. A first network node as in any one of the preceding clauses, arranged to obtain a shared matrix (A) by generating a random seed and sending the random seed through the communication channel to the other node, the first and second network node using the random seed to seed a deterministic pseudo random number generator, generating the matrix (A) from output of the pseudo random number generator.

16. An electronic cryptographic operation method (400) for a first electronic network node (110), the method comprising
    arranging (410) digital communication between the first network node and a second network node,
    receive (415) as input a difficulty parameter (d), and a structure parameter (n),
    obtaining (420) a shared matrix (A), the shared matrix being shared with the second network node through the communication interface, the shared matrix (A) is a square matrix (k×k) of dimension (k) equal to the difficulty parameter (d) divided by the structure parameter (n), the entries in the shared matrix (A) being integer polynomials of degree less than the structure parameter (n), coefficients of the polynomials preferably being selected modulo a first modulus (q),
    generating (430) a private key matrix ($S_I$), entries in the private key matrix being integer polynomials of degree less than the structure parameter (n)
    generating (440) a public key matrix ($P_I$) by
        computing (442) a matrix product between the shared matrix (A) and the private key matrix ($S_I$) modulo the first modulus (q) and modulo a reduction polynomial (f) with degree equal to the structure parameter (n), obtaining a matrix product, and adding noise (444) to the entries in the matrix product,
    sending (452) the public key matrix of the first network node to the second network node.

An aspect of this invention is a first electronic network node configured for a cryptographic operation, the first network node comprising
    a communication interface arranged for digital communication with a second network node,
    a processor circuit configured to
        receive as input a difficulty parameter (d), and a structure parameter (n),
        obtain a shared matrix (A), the shared matrix being shared with the second network node through the communication interface, the shared matrix (A) being a square matrix (k×k) of dimension (k) equal to the difficulty parameter (d) divided by the structure parameter (n), the entries in the shared matrix (A) being integer polynomials of degree less than the structure parameter (n), coefficients of the polynomials preferably being selected modulo a first modulus (q),
        generate a private matrix ($S_I$), entries in the private matrix being integer polynomials of degree less than the structure parameter (n),
        generate a public matrix of the first network node ($P_I$) by
            computing a matrix product between the shared matrix (A) and the private matrix ($S_I$) modulo the first modulus (q) and modulo a reduction polynomial (f) with degree equal to the structure parameter (n), obtaining a matrix product, and adding noise to the entries in the matrix product, and
        send the public matrix of the first network node to the second network node.
Such a processor circuit may be further configured to
    receive a public matrix ($P_R$) of the second network node,
    compute a raw key as a matrix product between the received public matrix of the second node and the private matrix of the first network node, wherein the first network node is further configured to
receive cryptographic material of the second network node,
compute shared data between the first network node and the second network node from the received cryptographic material and the raw key, or
wherein the first network node is further configured to
obtain shared data between the first network node and the second network node and obtain cryptographic material from the raw key,
send the cryptographic material to the second network node.

For example, the private matrix may be a private key matrix, e.g., in case the cryptographic operation is key exchange or a key encapsulation mechanism. One or more of the public matrix of the first network node and the public matrix of the second network node may be a public key matrix, e.g., in case the cryptoghraphic operation is key exchange, a key encapsulation mechanism, or public-key encryption. The shared data may be a shared key or data from which a shared key is derived, e.g., in case the cryptographic operation is key exchange or a key encapsulation mechanism; or a message, e.g., in case the cryptographic operation is public-key encryption. The cryptographic material may be reconciliation data, e.g., in case the cryptographic operation is key exchange or a key encapsulation mechanism, or it may be a ciphertext part, e.g., in case the cryptographic operation is public-key encryption, or key exchange or a key encapsulation based on public-key encryption.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A first network node comprising:
a communication interface circuit, wherein the communication interface circuit is arranged to communicate with a second network node; and
a processor circuit,
wherein the processor circuit is arranged to receive a difficulty parameter (d), and a structure parameter (n),
wherein the processor circuit is arranged to obtain a shared matrix (A),
wherein the shared matrix (A) is shared with the second network node through the communication interface circuit,
wherein the shared matrix (A) is a square matrix of dimension (k),
wherein dimension (k) is equal to the difficulty parameter (d) divided by the structure parameter (n),
wherein the shared matrix (A) comprises a plurality of shared matrix entries,
wherein at least a portion of the shared matrix entries are integer polynomials of degree less than the structure parameter (n),
wherein coefficients of the polynomials are selected modulo a first modulus (q),
wherein the processor circuit is arranged to generate a private key matrix ($S_I$),
wherein the private key matrix ($S_I$) comprises a plurality of private key entries,
wherein at least a portion of the private key entries are integer polynomial of degree less than the structure parameter (n),
wherein the processor circuit is arranged to generate a public key matrix ($P_I$) of the first network node,
wherein the generation of the public key matrix ($P_I$) comprises computing a matrix product between the shared matrix (A) and the private key matrix ($S_I$) modulo the first modulus (q) and modulo a reduction polynomial (f) with degree equal to the structure parameter (n), obtaining a matrix product,
wherein the matrix product comprises a plurality of matrix product entries,
wherein the processor circuit is arranged to add noise to at least a portion of the matrix product entries, and
wherein the processor circuit is arranged to send the public key matrix ($P_I$) of the first network node to the second network node.

2. The first network node as in claim 1,
wherein the processor circuit is arranged to receive a public key matrix ($P_R$) of the second network node,
wherein the processor circuit is arranged to compute a raw key as a matrix product between the received public key matrix ($P_R$) of the second node and the private key matrix ($S_I$) of the first network node,
wherein the first network node is arranged to receive reconciliation data (h) of the second network node,
wherein the processor circuit is arranged to compute a shared key or message by applying a reconciliation function (rec) to the received reconciliation data and the raw key.

3. The first network node as in claim 2,
wherein the reconciliation data is obtained from the raw key and from the shared key or message.

4. The first network node as in claim 1, wherein the cryptographic operation is selected from the group consisting of a key exchange protocol, a key encapsulation mechanism, public-key encryption, a digital signature.

5. The first network node as in claim 1, wherein the processor circuit is configured to receive a selector, selecting a cryptographic operation from multiple different cryptographic operations.

6. The first network node as in claim 1, wherein the reduction polynomial is $x^n+1$ or $$\frac{x^n - 1}{x - 1}.$$

7. The first network node as in claim 1,
wherein the first network node is configured to receive different difficulty parameters (d), and/or different structure parameters (n),
wherein the first network node is configured to call a common matrix multiplication part for different values of the structure parameter (n) and/or difficulty parameter (d).

8. The first network node as in claim 1,
wherein the structure parameter is an integer,
wherein the integer is at least 1, and at most the difficulty parameter (d), and/or
wherein the structure parameter is equal to 1 or to the difficulty parameter (d),
wherein the structure parameter plus one is restricted to be a prime number,
wherein the first modulus is a prime number,
wherein the structure parameter plus one divides the first modulus minus one, and/or
wherein the structure parameter plus one is restricted to be a prime number,
wherein the first modulus is a power of two,
wherein the reduction polynomial is irreducible modulo two.

9. The first network node as in claim 1,
wherein the processor circuit is configured to compute an expanded shared matrix for shared matrix (A), by replacing at least a portion of the polynomial entries of degree larger than 0, with a circulant matrix,
wherein the expanded shared matrix having a number of columns and rows equal to the difficulty parameter (d).

10. The first network node as in claim 1,
wherein the cryptographic operation is public key encryption or public key generation,
wherein the public key comprises the public key matrix ($P_I$) of the first network node and the shared matrix (A) or a seed from which it is obtained, or the public key matrix ($P_R$) of the second network node and the shared matrix (A) or a seed from which it is obtained
wherein the private key comprises the private key matrix ($S_I$) or.

11. The first network node as in claim 1,
wherein adding noise to at least a portion of the matrix product entries comprises multiplying the unscaled entry with the second modulus, dividing by the first modulus, rounding to an integer, and taking the rounded entry modulo the second modulus, computing a raw key as a matrix product between the received public key of the second node,
wherein the private key matrix ($S_I$) of the first network node is modulo the second modulus (p).

12. The first network node as in claim 1,
wherein coefficients of elements in the private key matrix ($S_I$) are bounded in absolute value by one,
wherein columns and/or rows have a fixed total number of nonzero coefficients.

13. The first network node as in claim 1, wherein the private key matrix ($S_I$) is chosen uniformly random from candidate private key matrices.

14. The first network node as in claim 1, wherein the first network node is arranged to obtain a different shared matrix (A) and/or generate a different private key matrix for each new cryptographic operation.

15. The first network node as in claim 1,
wherein the first network node is arranged to obtain the shared matrix (A) by generating the matrix (A) from output of a deterministic pseudo random number generator seeded by a seed,
wherein the shared matrix (A) is shared with the second network node by sending the random seed through the communication interface circuit.

16. A first network node comprising
a communication interface circuit, wherein the communication interface circuit is arranged to communicate with a second network node; and
a processor circuit,
wherein the processor circuit is arranged to receive a difficulty parameter (d), and a structure parameter (n),
wherein the processor circuit is arranged to obtain a shared matrix (A),
wherein the shared matrix (A) is shared with the second network node through the communication interface circuit,
wherein the shared matrix (A) is a square matrix of dimension (k),
wherein dimension (k) is equal to the difficulty parameter (d) divided by the structure parameter (n),
wherein at least a portion of the shared matrix entries are integer polynomial of degree less than the structure parameter (n),
wherein coefficients of the polynomials preferably is selected modulo a first modulus (q),
wherein the processor circuit is arranged to generate a private matrix (S I),
wherein the private key matrix (S I) comprises a plurality of private key entries,
wherein at least a portion of the private matrix entries are integer polynomial of degree less than the structure parameter (n),
wherein at least a portion of the private matrix entries generate a first ciphertext part (P I) by
wherein the generation of the first ciphertext part (P I) comprises computing a matrix product between the shared matrix (A) and the private matrix (S I) modulo the first modulus (q) and modulo a reduction polynomial (f) with degree equal to the structure parameter (n), obtaining a matrix product,
wherein the matrix product comprises a plurality of matrix product entries,
wherein the processor circuit is arranged to add noise to at least a portion of the matrix product entries,
wherein the processor circuit is arranged to receive a public key matrix (P R) of the second network node,
wherein the processor circuit is arranged to compute a raw key as a matrix product between the received public key matrix (P R) of the second node and the private matrix of the first network node,
wherein the processor circuit is arranged to compute a second ciphertext part from the raw key and from a message,
wherein the processor circuit is arranged to send the first ciphertext part and the second ciphertext part to the second network node.

17. A first network node comprising
a communication interface circuit, wherein the communication interface circuit is arranged to communicate with a second network node; and
a processor circuit,
wherein the processor circuit is arranged to receive a difficulty parameter (d) and a structure parameter (n), wherein the processor circuit is arranged to obtain a private key matrix ($S_I$), wherein the private key matrix ($S_I$) comprises a plurality of private key entries, wherein at least a portion of the private matrix entries are integer polynomial of degree less than the structure parameter (n), wherein the processor circuit is arranged to receive a first ciphertext part ($P_R$) and a second ciphertext part from the second network node, wherein the first ciphertext part is generated by computing a matrix product between a shared matrix (A) and a private matrix ($S_I$) modulo a first modulus (q) and modulo a reduction polynomial (f) with degree equal to the structure parameter (n), obtaining a matrix product, wherein the matrix product comprises a plurality of matrix product entries, wherein the processor circuit is arranged to add noise to the entries in at least a portion of the matrix product entries, wherein the shared matrix (A) is shared with the second network node through the communication interface circuit, wherein the shared matrix (A) is a square matrix of dimension (k), wherein dimension (k) is equal to the difficulty parameter (d) divided by the structure parameter (n), wherein the shared matrix (A) comprises a plurality of shared matrix entries, wherein at least a portion of the shared matrix entries are integer polynomial of degree less than the structure parameter (n), wherein each coefficient of the polynomials are selected modulo the first modulus (q), wherein at least a portion of the private key entries are integer polynomials of degree less than the structure parameter (n), wherein the processor circuit is arranged to compute a raw key as a matrix product between the first ciphertext part and the private key matrix ($S_I$), wherein the processor circuit is arranged to compute a message from the raw key and the second ciphertext part.

18. An cryptographic operation method comprising arranging communication between the first network node and a second network node;

receiving a difficulty parameter (d), and a structure parameter (n);

obtaining a shared matrix (A), wherein the shared matrix (A) is shared with the second network node through the circuit, wherein the shared matrix (A) is a square matrix of dimension (k), wherein dimension (k) is equal to the difficulty parameter (d) divided by the structure parameter (n), wherein the shared matrix (A) comprises a plurality of shared matrix entries, wherein at least a portion of the shared matrix entries are integer polynomial of degree less than the structure parameter (n), wherein coefficients of the polynomials preferably is selected modulo a first modulus (q);

generating a private key matrix ($S_I$), wherein the private key matrix ($S_I$) comprises a plurality of private key entries, wherein at least a portion of the private key entries are integer polynomial of degree less than the structure parameter (n);

generating a public key matrix ($P_I$) of the first network node by computing a matrix product between the shared matrix (A) and the private key matrix ($S_I$) modulo the first modulus (q) and modulo a reduction polynomial (f) with degree equal to the structure parameter (n);

obtaining a matrix product, wherein the matrix product comprises a plurality of matrix product entries;

adding noise to at least a portion of the matrix product entries;

sending the public key matrix ($P_I$) of the first network node to the second network node.

19. A computer program stored on a non-transitory medium, wherein the computer program when executed on processor performs the method as claimed in claim 18.

20. The first network node as in claim 1, wherein the first network node is arranged to obtain a shared key or a message and obtain reconciliation data from the raw key, wherein the first network node is arranged to send the reconciliation data to the second network node.

21. The first network node as in claim 2, wherein the shared key and reconciliation data are obtained from the raw key.

* * * * *